United States Patent
Cutsforth

(10) Patent No.: US 7,685,904 B2
(45) Date of Patent: Mar. 30, 2010

(54) ADJUSTABLE RISER ASSEMBLY

(75) Inventor: Rockford F. Cutsforth, Cohasset, MN (US)

(73) Assignee: Rox Speed FX, Inc., Cohasset, MN (US)

( * ) Notice: Subject to any disclaimer, the term of this patent is extended or adjusted under 35 U.S.C. 154(b) by 1057 days.

(21) Appl. No.: 11/223,716

(22) Filed: Sep. 9, 2005

(65) Prior Publication Data

US 2007/0068331 A1    Mar. 29, 2007

(51) Int. Cl.
*B62K 21/16* (2006.01)
(52) U.S. Cl. .................................... 74/551.3
(58) Field of Classification Search ..... 74/551.1–551.9; 211/175, 182, 187, 190, 207; 248/56, 70, 248/73, 74.1, 558; 180/219; 280/276, 280; 403/52, 83, 102, 110
See application file for complete search history.

(56) References Cited

U.S. PATENT DOCUMENTS

| | | | |
|---|---|---|---|
| 549,792 A * | 11/1895 | Hood ......................... 74/551.3 |
| 608,021 A | 7/1898 | Bille | |
| RE29,029 E * | 11/1976 | Harris ........................... 5/181 |
| 4,735,310 A * | 4/1988 | Lemery et al. .............. 206/319 |
| 5,121,652 A | 6/1992 | Morrone | |
| 5,259,266 A | 11/1993 | Morrone | |
| 5,323,664 A | 6/1994 | Fairfield et al. | |
| 5,357,826 A | 10/1994 | Morrone | |
| 5,509,328 A | 4/1996 | Lai | |
| 5,685,201 A | 11/1997 | Renshaw | |
| 5,779,253 A | 7/1998 | Lee | |
| 5,887,490 A | 3/1999 | Dittmar | |
| 5,921,145 A | 7/1999 | Muser | |
| 6,206,395 B1 | 3/2001 | Young | |
| 6,282,981 B1 | 9/2001 | Tsai | |
| 6,619,683 B1 | 9/2003 | Lin et al. | |
| 6,679,460 B2 * | 1/2004 | Nicolia et al. .............. 248/74.1 |
| 6,920,806 B2 * | 7/2005 | Cutsforth .................... 74/551.8 |
| 7,344,329 B2 * | 3/2008 | Hutchinson et al. ....... 403/109.1 |
| 2004/0016316 A1 * | 1/2004 | Bechler ..................... 74/551.3 |

* cited by examiner

*Primary Examiner*—Vicky A Johnson
(74) *Attorney, Agent, or Firm*—Crompton, Seager & Tufte, LLC

(57) ABSTRACT

A handlebar riser assembly for use with a steering mechanism of a vehicle is disclosed. The riser assembly includes a pair of mounts for coupling a handlebar to a steering stem of a vehicle. Each mount includes a first member having an elongated slot and a protrusion extending from the side of the first member, and a second member having an elongated slot and a protrusion extending from the side of the second member. The first and second member are positioned together such that the protrusion from the first member is slidably disposed within the elongated slot of the second member, and the protrusion from the second member is slidably disposed within the elongated slot of the first member.

36 Claims, 16 Drawing Sheets

ADJUSTABLE RISER ASSEMBLY

TECHNICAL FIELD

The invention generally relates to handlebars for vehicles. More particularly, the invention relates to an apparatus and method for mounting handlebars to a vehicle.

BACKGROUND

The use of handlebars as a component of a steering assembly for a vehicle, for example, motorcycles, snowmobiles, all-terrain vehicles (ATVs), bicycles, watercraft, and other similar vehicles, is generally known. Several different structures and mechanisms have been implemented to mount handlebars to a vehicle, each having certain advantages and disadvantages. There is an ongoing desire to provide alternative designs for mounting a handlebar to a vehicle.

SUMMARY

Some embodiments of the invention are directed to a handlebar riser assembly for use in a steering assembly for a vehicle. In some embodiments, the riser assembly may include a pair of mounts for coupling a handlebar assembly to a steering structure of a vehicle, such as a steering stem. The mounts may be selectively longitudinally extended and/or contracted to a desired position for a rider. In some embodiments, the mounts may also be radially rotated and secured at a desired angle to the handlebar assembly and/or a steering structure, such as a steering stem. Thus, the riser assembly may provide rotational and/or longitudinal adjustment of the handlebar assembly relative to a steering structure of a vehicle.

Each mount may include a first member and a second member selectively slidably engaged with one another to provide selective extension and/or contraction of the riser assembly. The first member may include an elongated slot allowing a fastener to extend therethrough. The fastener may couple the first member to the second member. Loosening the fastener allows the first member to be longitudinally slidably adjusted relative to the second member, and tightening the fastener secures the first member to the second member, preventing longitudinal movement between the first member and the second member.

In some embodiments, the second member may include a protrusion extending through the elongated slot of the first member and selectively slidable throughout the length of the slot. The protrusion may include a bore for receiving the fastener extending through the slot. The protrusion may abut the ends of the elongated slot as the first member is longitudinally extended and/or contracted relative to the second member to the extents of the range of motion through the elongated slot.

In some embodiments, the second member may also include an elongated slot, and the first member may include a protrusion extending through the elongated slot of the second member and selectively slidable throughout the length of the slot. Thus, each member may include an elongated slot, providing additional range of travel for selectively extending and/or contracting the riser assembly.

The first member may include a coupling portion for coupling the first member to a steering structure or assembly, such as a handlebar assembly. For example, the coupling portion may include a concave surface for mating with and coupling the first member to a tubular portion of a handlebar assembly. The second member may include a coupling portion for coupling the second member to a steering structure or assembly, such as a steering stem. For example, the coupling portion may include a concave surface for mating with and coupling the second member to a tubular portion of a steering stem.

BRIEF DESCRIPTION OF THE DRAWINGS

The invention may be more completely understood in consideration of the following detailed description of various embodiments in connection with the accompanying drawings, in which.

Figure 1:
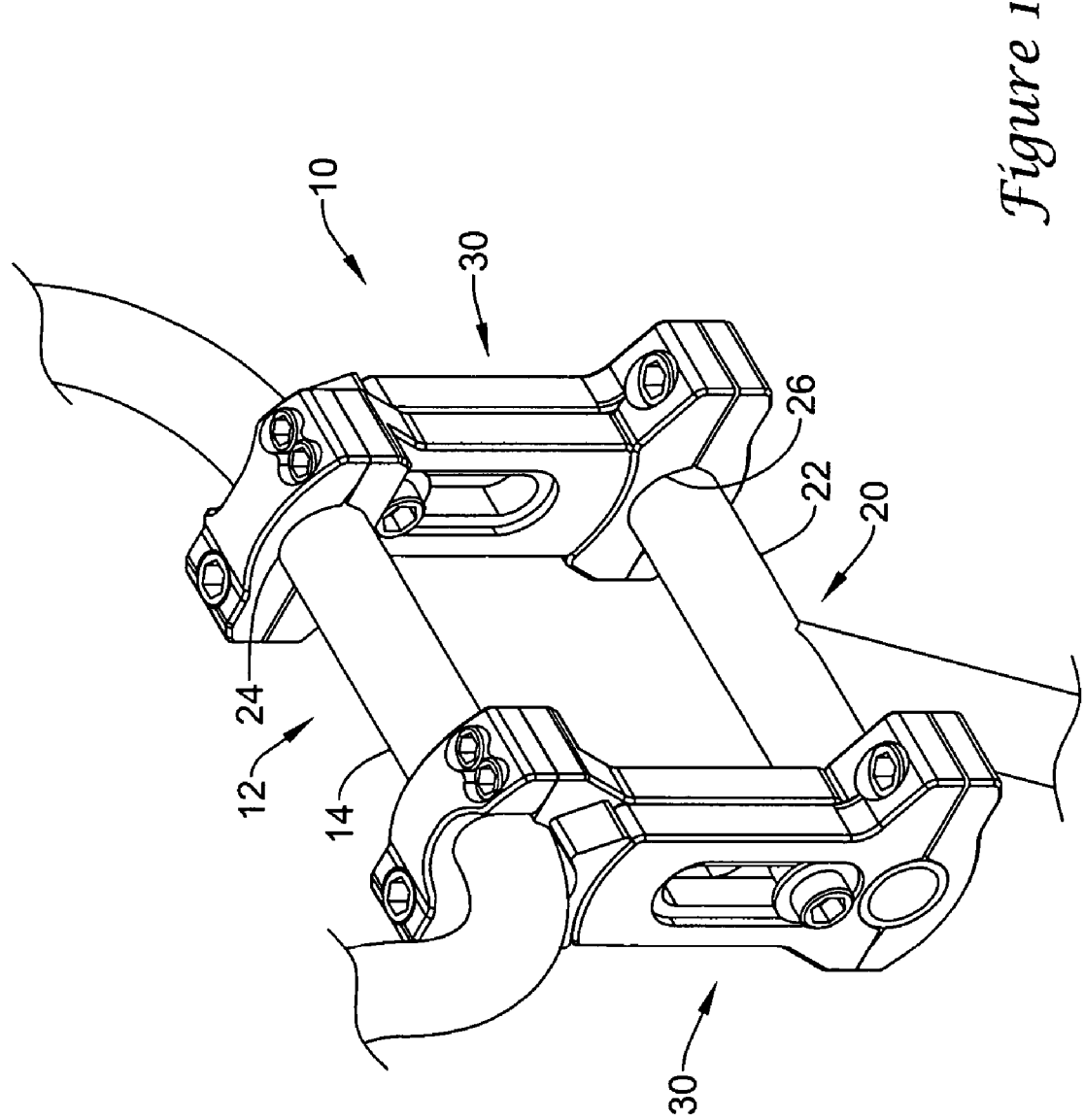
FIG. 1 is a perspective view of an illustrative riser assembly coupled between a handlebar assembly and a steering structure of a vehicle in a contracted position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The use of the terms "first", "second", "upper", or "lower" are intended to be used throughout the specification and the appended claims as being descriptive in nature to differentiate individual components, and the terms are not intended to be limiting in any fashion.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Now referring to the drawings, FIG. 1 is a perspective view of an illustrative riser assembly 10 for use in a steering system of a vehicle. The riser assembly 10 may be coupled between a handlebar assembly 12 and a steering structure 20, such as a steering stem 22, of a vehicle. The handlebar assembly 12 may include a unitary handlebar, a multi-piece handlebar, mirrors, switches, gauges, and/or controls, for example. Typically, a handlebar assembly 12 includes a tubular member bent or shaped into a desired shape to form a handlebar 14 which may have hand grips (not shown) located at the outer extents of the handlebar 14. Although the riser assembly 10 is shown mounted between a handlebar assembly 12 and a steering stem 22, typical of many vehicles, those of skill in the art and others will recognize that other steering systems and other steering structures exist, and that the riser assembly 10 may be appropriately configured to be mounted in such an alternative arrangement.

In FIG. 1, the riser assembly 10 is in a contracted position, such that the handlebar 14 is positioned in the closest location to the steering stem 22 allowed by the assembly 10. The riser assembly 10 may be longitudinally extendable such that the handlebar 14 may be extended or contracted relative to the steering stem 22. Thus, the distance between the upper coupling location 24 between the riser assembly 10 and the handlebar 14 and the lower coupling location 26 between the riser assembly 10 and the steering stem 22 may be varied. For example the riser assembly 10 may provide infinite variability of the distance between the coupling locations 24, 26 allowed by the assembly 10, or the riser assembly 10 may provide finite variability at discrete positions controlling the distance between the coupling locations 24, 26 allowed by the assembly 10.

Figure 2:
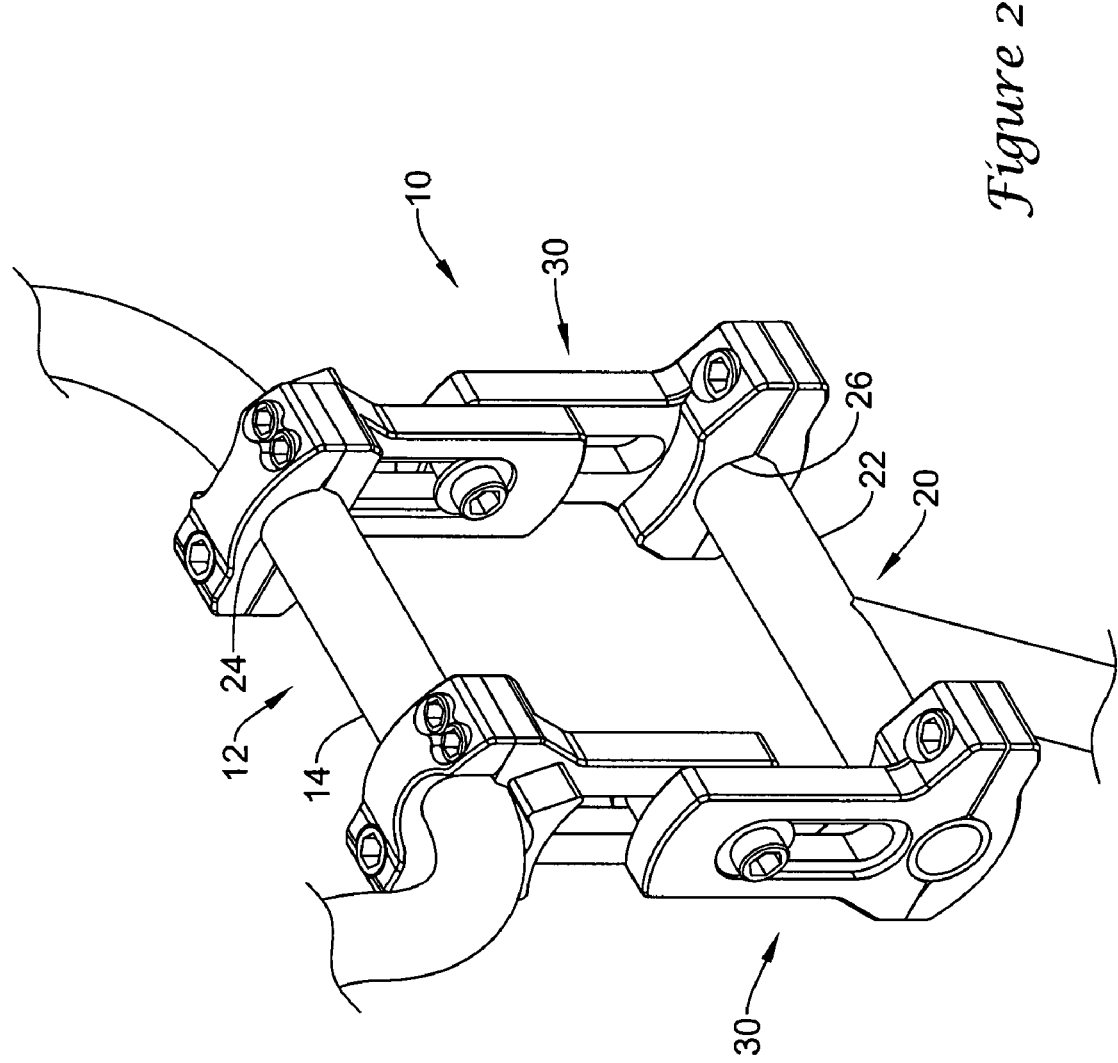
FIG. 2 is a perspective view of an illustrative riser assembly coupled between a handlebar assembly and a steering structure of a vehicle in an extended position.

FIG. 2 shows the riser assembly 10 in an extended position with the handlebar 14 positioned in the furthest location from the steering stem 22 allowed by the assembly 10. Thus, the distance between the coupling locations 24, 26, and therefore the height of the handlebar assembly 12, may be appropriately adjusted as desired by an operator of the vehicle. Rotational control of the handlebar assembly 12 relative to the steering stem 22 may also be achieved with the riser assembly 10 by controlling the radial angle that the riser assembly 10 is coupled to the handlebar assembly 12 and/or the steering stem 22. Thus, two degrees of adjustment (e.g., rotational and longitudinal) may be accomplished with the riser assembly 10.

The riser assembly 10, as shown in FIGS. 1 and 2, may include a pair of supports or mounts 30 coupled between the handlebar assembly 12 and the steering stem 22 of the vehicle. In describing the riser assembly 10 as including a pair of supports or mounts 30, it is intended to mean the riser assembly 10 may include two supports or mounts 30. Although the riser assembly 10, as shown in FIGS. 1 and 2, includes a pair of supports or mounts 30, it is contemplated that the assembly 10 may include only one support or mount 30 or the assembly 10 may include more than two supports or mounts 30, for example 3, 4, 5 or more supports or mounts 30. As shown in FIGS. 1 and 2, each support or mount 30 may be similar or identical. For example, each of the supports or mounts 30 shown in FIGS. 1 and 2 may be mirror images of each other. In other words, each support or mount 30 may include the same components in a reverse configuration and orientation. In some embodiments, each support or mount 30 may be identical, thus providing interchangeability of the supports or mounts 30. However, in some embodiments, each support or mount 30 may be dissimilar, depending on the desired application.

Figure 3:
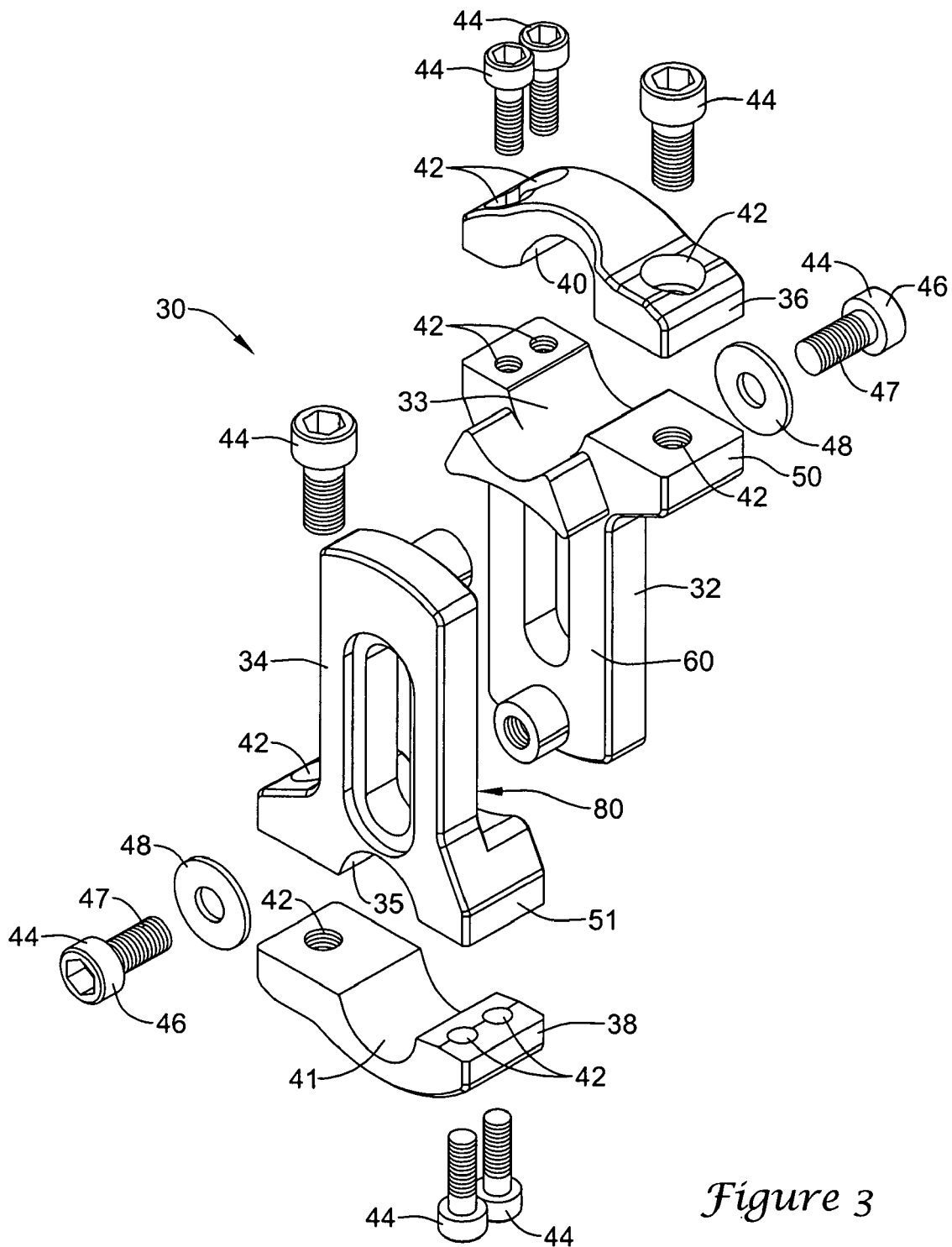
FIG. 3 is an exploded view of a mount of an illustrative riser assembly.

FIG. 3 illustrates an exploded view of the components of one of the mounts 30 of the riser assembly 10. The mount 30 includes a first, upper member 32 and a second, lower member 34. In an appropriate assembled configuration, the upper member 32 may be positioned in sliding contact with the lower member 34. For example, the first side 60 of the upper member 32, which may be a planar side, a concave side, or a convex side, for example, may abut or otherwise contact the first side 80, which may be a planar side, of the lower member 34. The upper and lower members 32, 34 may slidably extend relative to one another.

In other embodiments, the upper and/or lower members 32, 34 may be alternative structures, for example, tubes, rods, bars, channels etc. that may be adapted to mate with one another in slidable engagement, but may be selectively secured to one another to prevent extension and/or contraction of the upper member 32 relative to the lower member 34. In some embodiments, one of the upper and/or lower members 32, 34 may be a tubular member having an inner surface and the other of the upper or lower members 32, 34 may be a tubular member or solid member disposed in the tubular member such that the inner surface of one member may be in contact with the outer surface of the other member. A fastener or fastening structure may be used to selectively secure the two members together to prevent longitudinal movement between the two members.

The upper member 32 may include a coupling portion 50 adapted and configured to be coupled to a portion of a handlebar assembly 12. For example, the coupling portion 50 may include a surface adapted and configured to mate with a portion of a handlebar 14. For example, the concave surface 33 of the upper member 32, which may be a semi-circular surface, may be configured to mate with a tubular portion of a handlebar 14. The lower member 34 may include a coupling portion 51 adapted and configured to be coupled to a portion of a steering structure 20. For example, the coupling portion 51 may include a surface preferably adapted and configured to mate with a portion of a steering stem 22. For example, the concave surface 35 of the lower member 34, which may be a semi-circular surface, may be configured to mate with a tubular portion of a steering stem 22.

Additionally, the mount 30 may include a first, upper cap 36 and a second, lower cap 38 to facilitate clamping or coupling the mount 30 to another component of a steering mechanism, such as a handlebar 14 or a steering stem 22. The upper cap 36 may include a surface adapted and configured to mate with a portion of a handlebar 14. For example, the concave surface 40 of the upper cap 36, which may be a semi-circular surface, may be configured to mate with a tubular portion of a handlebar 14. The upper cap 36 may include one or a plurality of bores 42 for receiving fasteners 44 which may be used to secure the upper cap 36 to the upper member 32. For example, the upper cap 36 may include 1, 2, 3, 4, or more bores for receiving fasteners 44. Thus, a tubular portion of a handlebar 14 may be coupled between the upper member 32 and the upper cap 36, such that the tubular portion of the handlebar 14 is in contact with the concave surface 33 of the upper member 32 and in contact with the concave surface 40 of the upper cap 36. Therefore, the tubular portion of the handlebar 14 may be coupled or clamped between the concave surfaces 33, 40.

Additionally or alternatively, the lower cap 38 may include a surface adapted and configured to mate with a portion of a steering stem 22. For example, the concave surface 41 of the lower cap 38, which may be a semi-circular surface, may be configured to mate with a tubular portion of a steering stem 22. The lower cap 38 may include one or a plurality of bores 42 for receiving fasteners 44 which may be used to secure the lower cap 38 to the lower member 34. For example, the lower cap 38 may include 1, 2, 3, 4, or more bores for receiving fasteners 44. Thus, a tubular portion of a steering stem 22 may be coupled between the lower member 34 and the lower cap 38, such that the tubular portion of the steering stem 22 is in contact with the concave surface 35 of the lower member 34 and in contact with the concave surface 41 of the lower cap 38. Therefore, the tubular portion of the steering stem 22 may be coupled or clamped between the concave surfaces 35, 41.

The upper member 32 and/or the lower member 34 may include one or a plurality of bores 42 for receiving fasteners 44. For example, the upper member 32 may include the same number of bores 42 as the upper cap 36. Therefore, the bores 42 of the upper member 32 and the upper cap 36 may be in coaxial alignment when the riser assembly 10 is in an assembled orientation coupled to a handlebar assembly 12 of a vehicle. Likewise, the lower member 34 may include the same number of bores 42 as the lower cap 38. Therefore, the bores 42 of the lower member 34 and the lower cap 38 may be in coaxial alignment when the riser assembly 10 is in an assembled orientation coupled to a steering stem 22 of a vehicle.

A plurality of fasteners 44, for example threaded fasteners, such as threaded bolts, may be used to couple the upper member 32 to the lower member 34 and/or couple the mount 30 to a handlebar assembly 12 and/or a steering structure 20 of a vehicle. For example, fasteners 44 may be used to couple the upper cap 36 to the upper member 32 and/or couple the lower cap 38 to the lower member 34. The fastener 44 may include a head 46 and a threaded portion 47. In some embodiments the fastener 44 may include a washer 48 and/or a nut (not shown) to facilitate securement of the riser assembly 10.

The bores 42 may be through holes or the bores 42 may be blind holes. In some embodiments, a portion of the bores 42 may be through holes and the remainder of the bores 42 may be blind holes. The plurality of bores 42, or a portion thereof, may be threaded such that the fasteners 44, having a threaded portion 47 may be placed in the bores 42 and be threadably engaged therein. However, at least a portion of the bores 42 may not be threaded, allowing a fastener 44 to extend therethrough. In some embodiments, at least a portion of the bores 42 may be countersunk in order to accommodate the head 46 of a fastener 44.

Figure 4:
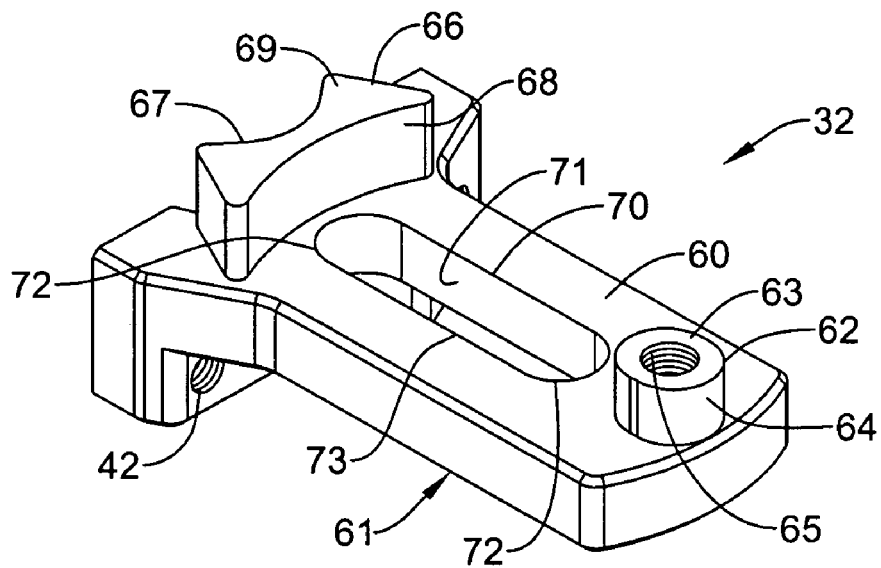
FIG. 4 is a perspective view of an upper member of a mount as shown in FIG. 3 showing the first side of the upper member.

The upper member 32 can be further described in reference to FIGS. 4-7. FIG. 4 is a perspective view of the upper member 32 taken from a first viewpoint looking towards the first side 60 of the upper member 32. In some embodiments, the first side 60 may be a planar surface and/or may include a planar surface. In other embodiments, the first side 60 may include a concave surface or a convex surface, for example. The planar surface may be a smooth surface, or the planar surface may be an irregular surface, such as a textured surface, a knurled surface, or a jagged surface, for example.

A protrusion 62 may extend outward from the first side 60. The protrusion 62 may be circular, oval, square, rectangular, or any other desired shape. The protrusion 62 may have an end surface 63 and a peripheral surface 64. In some embodiments, the end surface 63 may be a planar surface parallel to the first side 60. The protrusion 62 may include a bore 65. The bore 65 may be a through hole extending through the upper member 32, or the bore 65 may be a blind hole extending into the upper member 32, but not entirely through the upper member 32. The bore 65 may be threaded, thus the bore 65 may provide threaded engagement with a threaded portion 47 of a fastener 44, or the bore 65 may be unthreaded, thus allowing a fastener 44 to extend therethrough.

Additionally, the upper member 32 may include a support block 66 extending from the first side 60. The support block 66 may have a planar surface 69 parallel to the first side 60. The support block 66 may have a first concave surface 67 and a second concave surface 68. The first concave surface 67 and the second concave surface 68 may be orthogonal to both the planar surface 69 of the support block 66 and the first side 60 of the upper member 32. The first concave surface 67 may provide clearance for a handlebar 14 and/or may provide additional support for contacting a handlebar 14. The second concave surface 68 may provide an abutment surface for the end of the lower member 34. Thus, an end of the lower member 34 may abut against the second concave surface 68 when the upper and lower members 32, 34 of the mount 30 are in their fully contracted position.

One or more openings, such as the elongate slot 70, may extend into the first side of the upper member 32 and/or through the upper member 32. In some embodiments, the elongate slot 70 may extend through the upper member 32 from the first side 60 to the second side 61. The elongate slot 70 may extend along the first side 60 and include a peripheral wall 71 extending from the first side 60 to the second side 61. In other embodiments, the elongate slot 70 may not extend through the upper member 32 to the second side 61, but may extend from the first side 60 to a location within the upper member 32. The elongate slot 70 may have two semi-circular ends 72 and an elongate portion 73 extending between the two semi-circular ends 72. In some embodiments, the elongate slot 70 may extend along about 40% or more, about 50% or more, about 60% or more, or about 75% or more of the length of the upper member 32.

In other embodiments, the upper member 32 may include one or more openings, such as through holes or blind holes, extending into and/or through the upper member 32. For example, the upper member 32 may include a plurality of openings regularly or irregularly arranged along a portion of the length of the upper member 32. The one or more holes may be adapted to receive a fastener to selectively secure the upper member 32 to the lower member 34. In some embodiments, a plurality of holes may provide finite adjustment positions for the mount 30.

Figure 5:
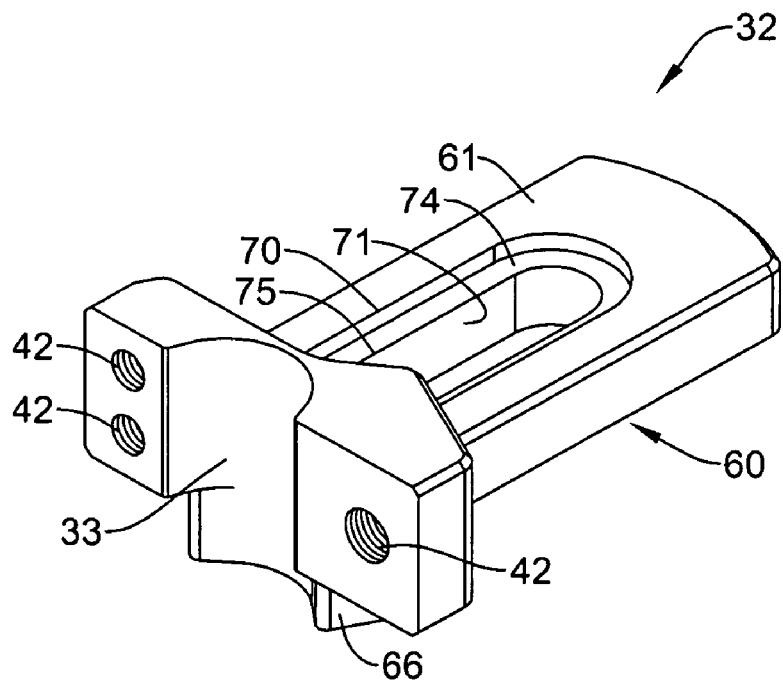
FIG. 5 is a perspective view of an upper member of a mount as shown in FIG. 3 showing the second side of the upper member.

FIG. 5 is an alternate perspective view of the upper member 32 taken from a second viewpoint looking towards the second side 61 of the upper member 32, in which the elongate slot 70 may be seen. The elongate slot 70 may include a flange 75 providing a stepped surface or jog in the peripheral wall 71. The flange 75 may extend around the periphery of the elongate slot 70, or the flange 75 may extend along only a portion of the periphery of the elongate slot 70. The flange 75 provides a stepped inner peripheral wall 71 of the elongate slot 70 having a jog or rim. Thus, the flange 75 may define a stepped edge 74 at a location intermediate the first side 60 and the second side 61 of the upper member 32. In the embodiment shown, the first side 60 and the second side 61 are parallel planar surfaces and the stepped edge 74 is a planar surface parallel to both the first side 60 and the second side 61.

Figure 6:
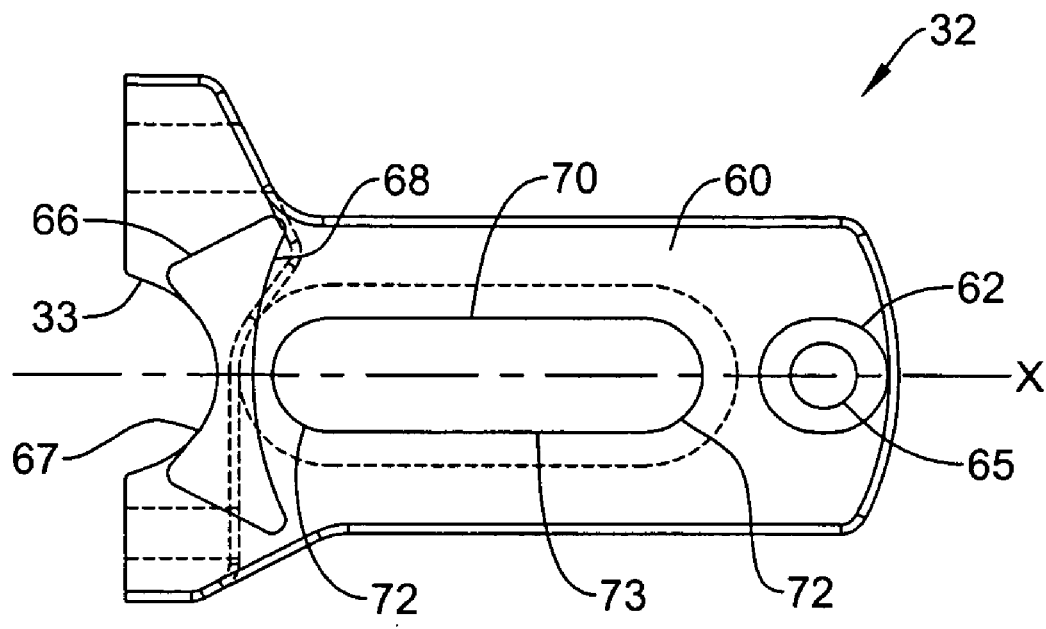
FIG. 6 is a top view of the upper member of FIG. 3.

FIG. 6 is a top view showing the first side 60 of the upper member 32. As shown in FIG. 6, the elongate slot 70 and the protrusion 62 may be aligned in a single longitudinal orientation along axis X. In other words, the center point of the protrusion 62 may be aligned with the center points of the semi-circular ends 72 of the elongate slot 70 along axis X. Additionally, the concave surfaces 67, 68 of the support block 66 and/or the concave surface 33 of the upper member 32 may be aligned in a single longitudinal orientation with the elongate slot 70 and the protrusion 62 along axis X. In other words, the center of curvature of each of the concave surfaces may be aligned along axis X.

Figure 7:
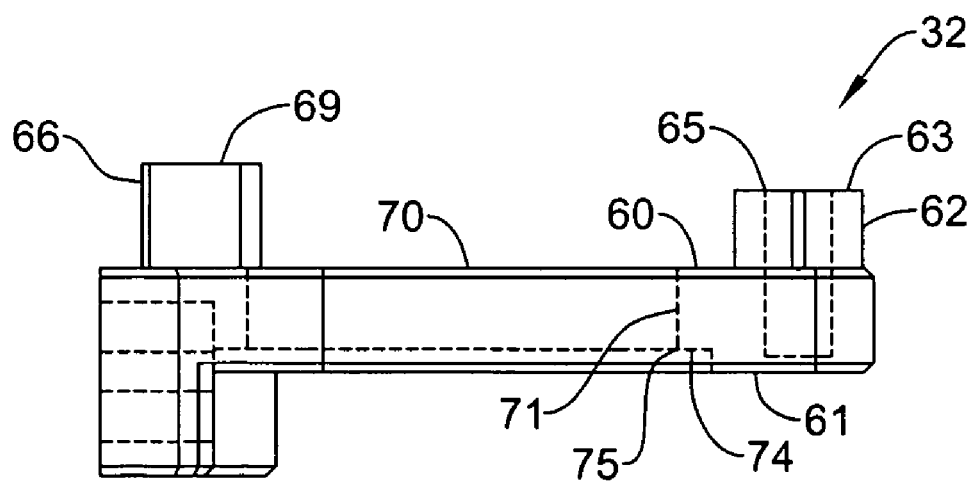
FIG. 7 is a side view of the upper member of FIG. 3.

FIG. 7 is a side view of the upper member 32 in which the flange 75 of the elongate slot 70 is shown. The first side 60 and the second side 61 of the upper member 32 may be planar surfaces parallel to one another. The flange 75 may have a stepped region extending around the periphery of the elongate slot 70 or only a portion thereof. The flange 75 creates a stepped edge 74. As shown, the stepped edge 74 may be a planar surface parallel to the first side 60 and/or the second side 61.

Additionally, the protrusion 62 is shown extending from the first side 60. The end surface 63 of the protrusion 62 may be a planar surface parallel to the first side 60 and/or the second side 61 of the upper member 32. As shown, the bore 65 may be a blind hole extending into the upper member 32. However, in some embodiments, the bore 65 may extend through the upper member 32 to the second side 61 of the upper member 32. The bore 65 may be threaded such that the bore 65 may provide threaded engagement with a threaded portion 47 of a fastener 44, or the bore 65 may be unthreaded, thus allowing a fastener 44 to extend therethrough.

Figure 8:
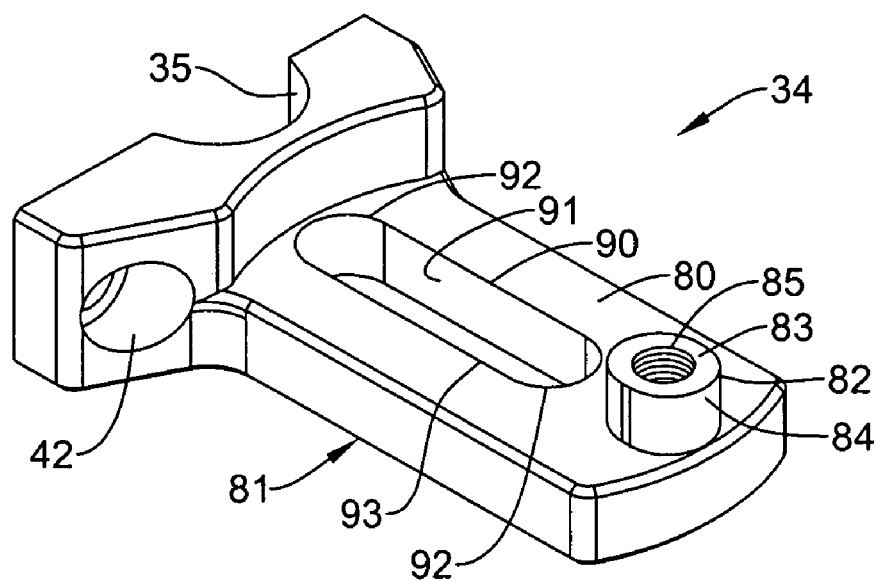
FIG. 8 is a perspective view of a lower member of a mount as shown in FIG. 3 showing the first side of the lower member.

The lower member 34 can be further described in reference to FIGS. 8-11. FIG. 8 is a perspective view of the lower member 34 taken from a first viewpoint looking towards the first side 80 of the lower member 34. In some embodiments, the first side 80 may be a planar surface or include a planar surface. In other embodiments, the first side 80 may include a concave surface or a convex surface, for example. The planar surface may be a smooth surface, or the planar surface may be an irregular surface, such as a textured surface, a knurled surface, or a jagged surface, for example.

A protrusion 82 may extend outward from the first side 80. The protrusion 82 may be circular, oval, square, rectangular, or any other desired shape. The protrusion 82 may have an end surface 83 and a peripheral surface 84. In some embodiments, the end surface 83 may be a planar surface parallel to the first side 80. The protrusion 82 may include a bore 85. The bore 85 may be a through hole extending through the lower member 34, or the bore 85 may be a blind hole extending into the lower member 34, but not entirely through the lower member 34. The bore 85 may be threaded, thus the bore 85 may provide threaded engagement with a threaded portion 47 of a fastener 44, or the bore 65 may be unthreaded, thus allowing a fastener 44 to extend therethrough.

One or more openings, such as the elongate slot 90, may extend into and/or through the lower member 34. In some embodiments, the elongate slot 90 may extend along the first side 80 and include a peripheral wall 91 extending from the first side 80 to the second side 81. In other embodiments, the elongate slot 90 may not extend through the lower member 34 to the second side 81, but may extend from the first side 80 to a location within the lower member 34. The elongate slot 90 may have two semi-circular ends 92 and an elongate portion 93 extending between the two semi-circular ends 92. In some embodiments, the elongate slot 90 may extend along about 40% or more, about 50% or more, about 60% or more, or about 75% or more of the length of the lower member 34.

In other embodiments, the lower member 34 may include one or more openings, such as through holes or blind holes, extending into and/or through the lower member 34. For example, the lower member 34 may include a plurality of openings regularly or irregularly arranged along a portion of the length of the lower member 34. The one or more holes may be adapted to receive a fastener to selectively secure the lower member 34 to the upper member 32. In some embodiments, a plurality of holes may provide finite adjustment positions for the mount 30.

Figure 9:
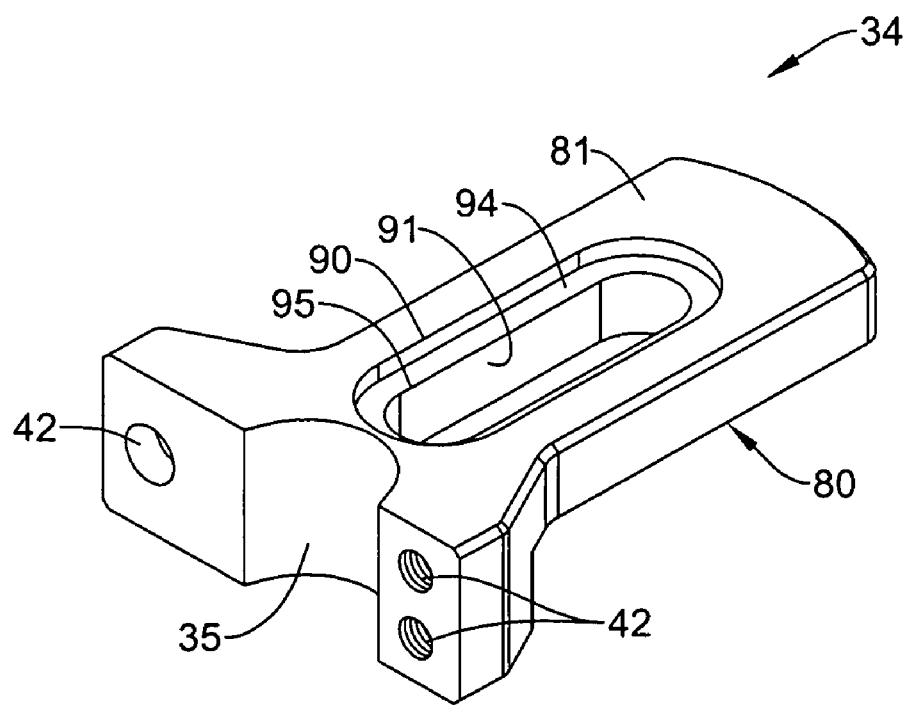
FIG. 9 is a perspective view of a lower member of a mount as shown in FIG. 3 showing the second side of the lower member.

FIG. 9 is an alternate perspective view of the lower member 34 taken from a second viewpoint looking towards the second side 81 of the lower member 34, in which the elongate slot 90 may be seen. The elongate slot 90 may include a flange 95 providing a stepped surface or jog in the peripheral wall 91. The flange 95 may extend around the periphery of the elongate slot 90, or the flange 95 may extend along only a portion of the periphery of the elongate slot 90. The flange 95 provides a stepped inner peripheral wall 91 of the elongate slot 90 forming a rim. Thus, the flange 95 may define a stepped edge 94 at a location intermediate the first side 80 and the second side 81 of the lower member 34. In the embodiment shown, the first side 80 and the second side 81 are parallel planar surfaces and the stepped edge 94 is a planar surface parallel to both the first side 80 and the second side 81.

Figure 10:
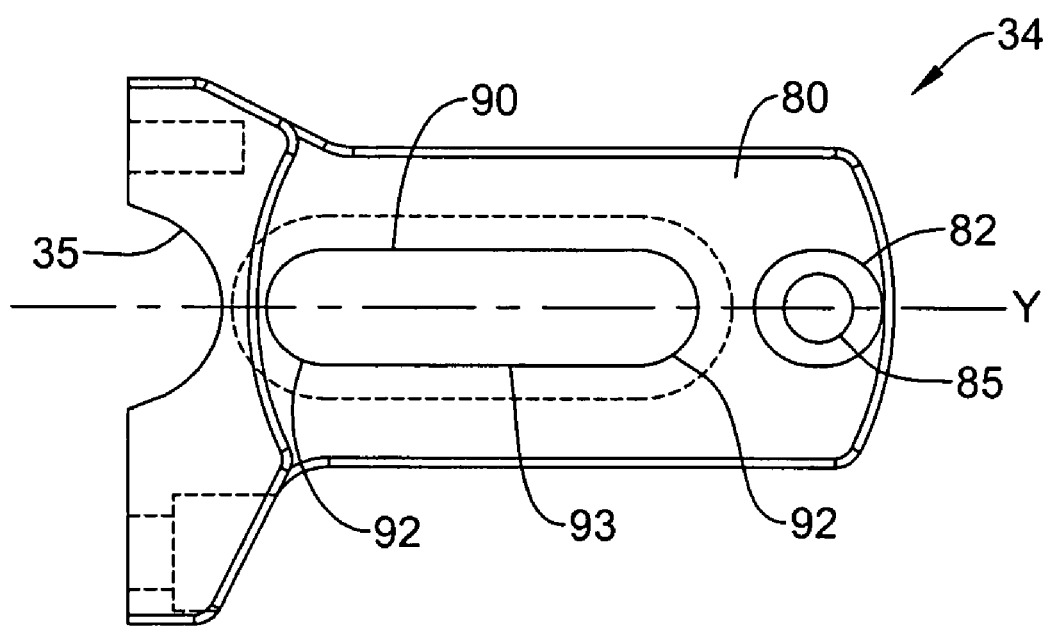
FIG. 10 is a top view of the lower member of FIG. 3.

FIG. 10 is a top view showing the first side 80 of the lower member 34. As shown in FIG. 10, the elongate slot 90 and the protrusion 82 may be aligned in a single longitudinal orientation along axis Y. In other words, the center point of the protrusion 82 may be aligned with the center points of the semi-circular ends 92 of the elongate slot 90 along axis Y. Additionally, the concave surface 35 of the lower member 34 may be aligned in a single longitudinal orientation with the elongate slot 90 and the protrusion 82 along axis Y. In other words, the center of curvature of the concave surface 35 may be aligned along axis Y.

Figure 11:
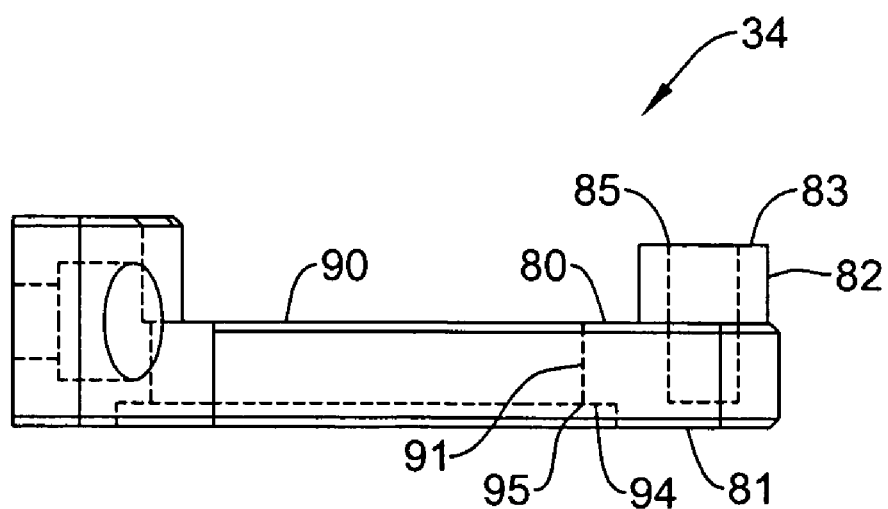
FIG. 11 is a side view of the lower member of FIG. 3.

FIG. 11 is a side view of the lower member 34 in which the flange 95 of the elongate slot 90 may seen. The first side 80 and the second side 81 of the lower member 34 may be planar surfaces parallel to one another. The flange 95 may have a stepped region extending around the periphery of the elongate slot 90 or only a portion thereof. The flange 95 creates a stepped edge 94. As shown, the stepped edge 94 may be a planar surface parallel to the first side 80 and/or the second side 81.

Additionally, the protrusion 82 is shown extending from the first side 80. The end surface 83 of the protrusion 82 may be a planar surface parallel to the first side 80 and/or the second side 81 of the lower member 34. As shown, the bore 85 may be a blind hole extending into the lower member 34. However, in some embodiments, the bore 85 may extend through the lower member 34 to the second side 81 of the lower member 34. The bore 85 may be threaded such that the bore 85 may provide threaded engagement with a threaded portion 47 of a fastener 44, or the bore 85 may be unthreaded, thus allowing a fastener 44 to extend therethrough.

Figure 12A:
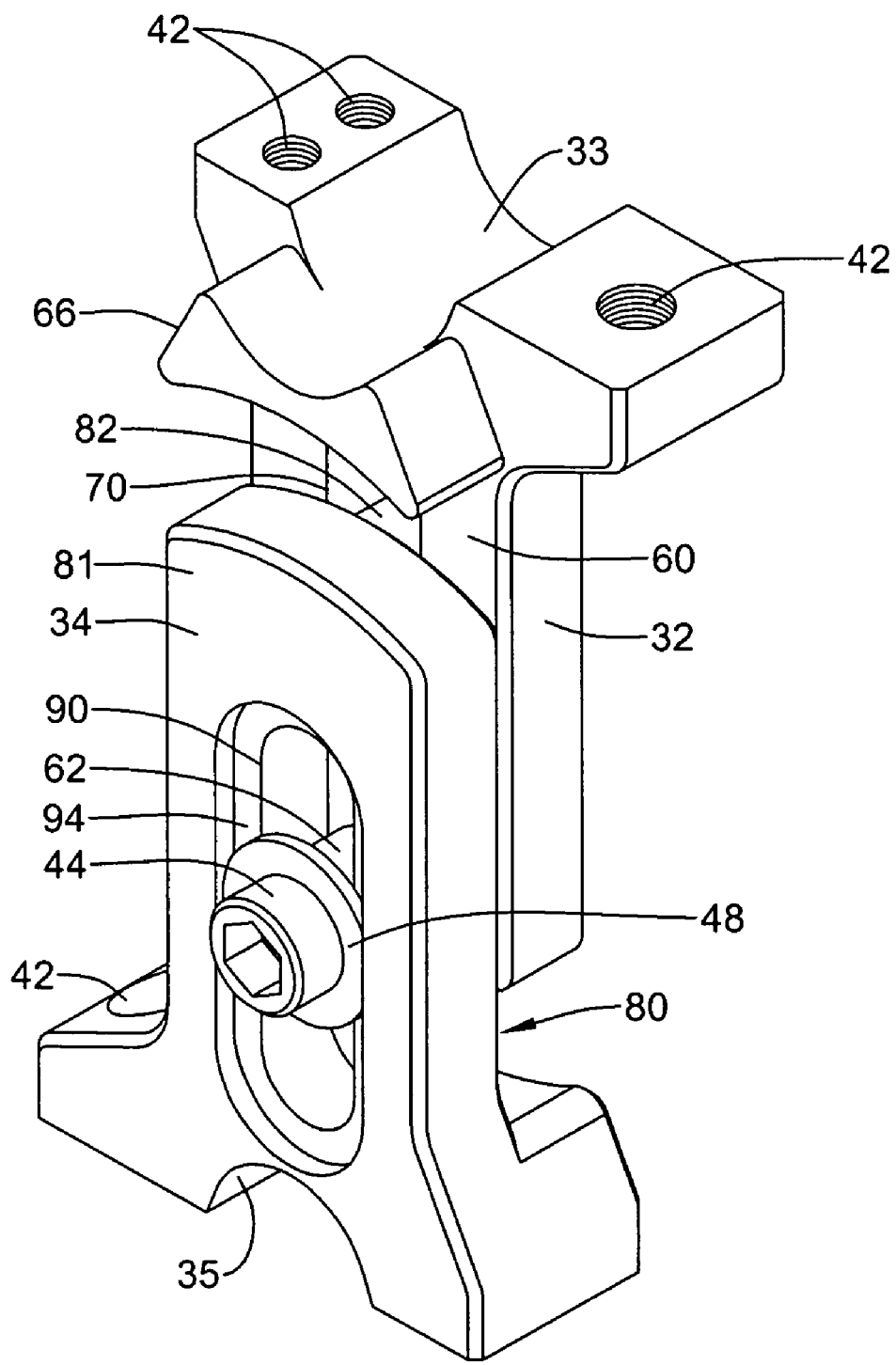
FIGS. 12A and 12B are perspective views of a mount as shown in FIG. 3 in an assembled configuration.
Figure 12B:
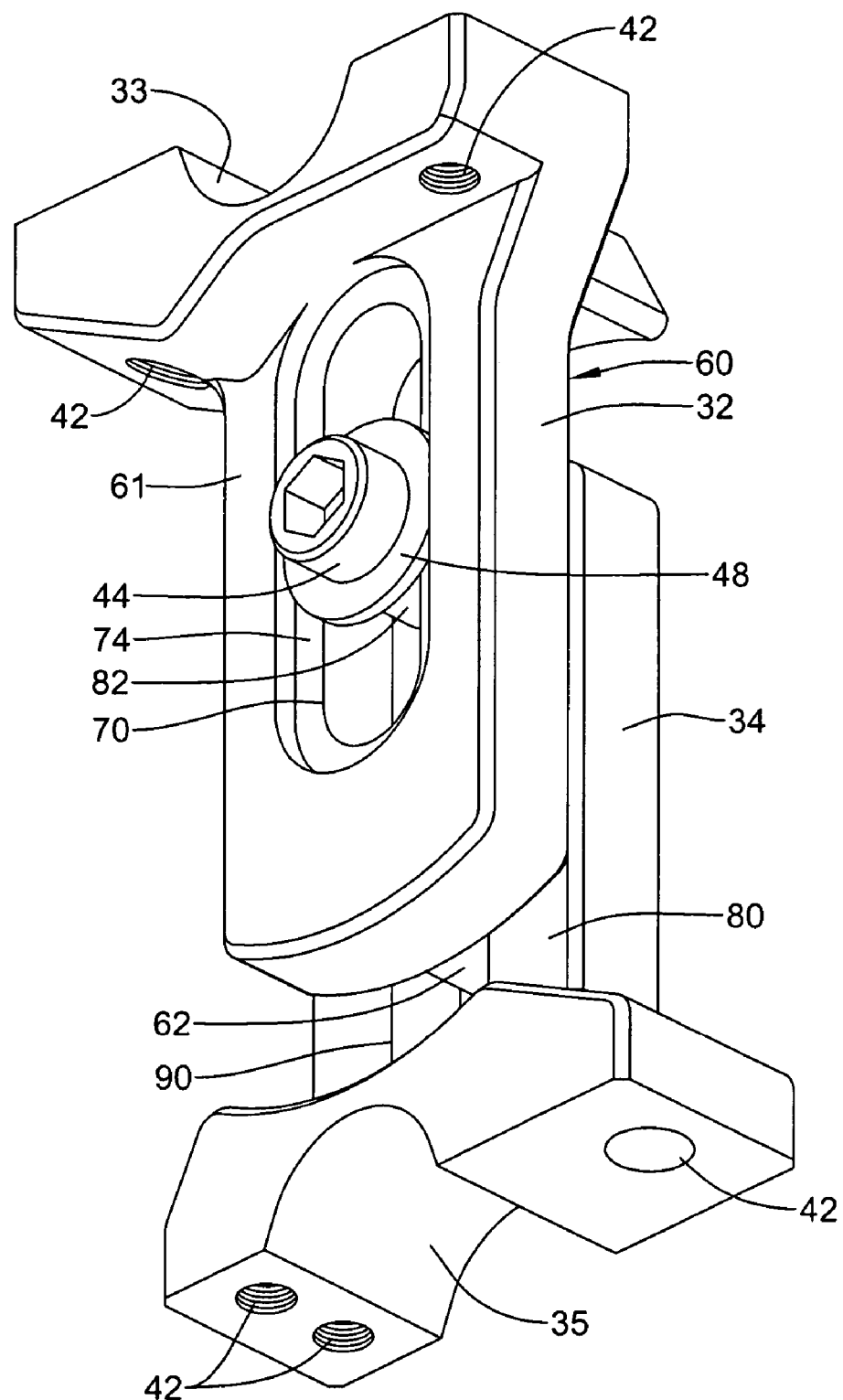

FIGS. 12A and 12B show the first member 32 and the second member 34 of a mount 30 in an assembled configuration. In an assembled configuration, the first side 60 of the upper member 32 may be in contact with the first side 80 of the lower member 34. For example, the planar surface of the first side 60 of the upper member 32 may abut the planar surface of the first side 80 of the lower member 34. The protrusion 82 of the second member 34 may extend into the elongate slot 70 of the first member 32 and be selectively slidable therein. When the protrusion 82 is disposed in the elongate slot 70, the end surface 83 of the protrusion 82 may be substantially co-planar with the stepped surface 74 of the flange 75 of the elongate slot 70. However, in some embodiments, a flange 75 may not be present. In such embodiments, the end surface 83 of the protrusion 82 may be substantially co-planar with the second surface 61 of the upper member 32. Additionally, the axis X of the upper member 32 may be co-planar with the axis Y of the lower member 34.

With reference to FIG. 12B, a fastener 44 may extend through the elongate slot 70 and may extend into the bore 85 of the protrusion 82 in order to couple the upper member 32 with the lower member 34. The head 46 of the fastener 44 (or a washer 48 if one is used) may be in contact with the stepped surface 74 of the elongate slot 70 and the end surface 83 of the protrusion 82. The threaded portion 47 of the fastener 44 may engage a threaded portion of the bore 85 or a threaded nut (not shown), and be tightened to force the first side 60 of the upper member 32 into contact with the first side 80 of the lower member 34 in order to prevent sliding movement of the upper member 32 relative to the lower member 34. The contact force between the first side 60 of the upper member 32 and the first side 80 of the lower member 34 may prevent the upper member 32 from sliding (e.g., longitudinally extending or contracting) relative to the lower member 34. The fastener 44 may be loosened in order to allow the upper member 32 to slidably extend relative to the lower member 34. Thus, by tightening and loosening the threaded fastener 44, the upper member 32 may be selectively longitudinally extended relative to the lower member 34.

Additionally or alternatively, with reference to FIG. 12A, the protrusion 62 of the first member 32 may extend into the elongate slot 90 of the second member 34 and be selectively slidable therein. When the protrusion 62 is disposed in the elongate slot 90, the end surface 63 of the protrusion 62 may be substantially co-planar with the stepped surface 94 of the flange 95 of the elongate slot 90. However, in some embodiments, a flange 95 may not be present. In such embodiments, the end surface 63 of the protrusion 62 may be substantially co-planar with the second surface 81 of the lower member 34.

A fastener 44 may extend through the elongate slot 90 and may extend into the bore 65 of the protrusion 62 in order to couple the upper member 32 with the lower member 34. The head 46 of the fastener 44 (or a washer 48 if one is used) may be in contact with the stepped surface 94 of the elongate slot 90 and the end surface 63 of the protrusion 62. The threaded portion 47 of the fastener 44 may engage a threaded portion of the bore 65 or a threaded nut (not shown), and be tightened to force the first side 60 of the upper member 32 into contact with the first side 80 of the lower member 34 in order to prevent sliding movement of the upper member 32 relative to the lower member 34. The contact force between the first side 60 of the upper member 32 and the first side 80 of the lower member 34 may prevent the upper member 32 from sliding (e.g., longitudinally extending or contracting) relative to the lower member 34. The fastener 44 may be loosened in order to allow the upper member 32 to slidably extend relative to the lower member 34. Loosening the fastener 44 reduces or eliminates the contact force between the first side 60 of the upper member 32 and the first side 80 of the lower member 34. Thus, by tightening and loosening the threaded fastener 44, the upper member 32 may be selectively longitudinally extended or contracted relative to the lower member 34.

Figure 13A:
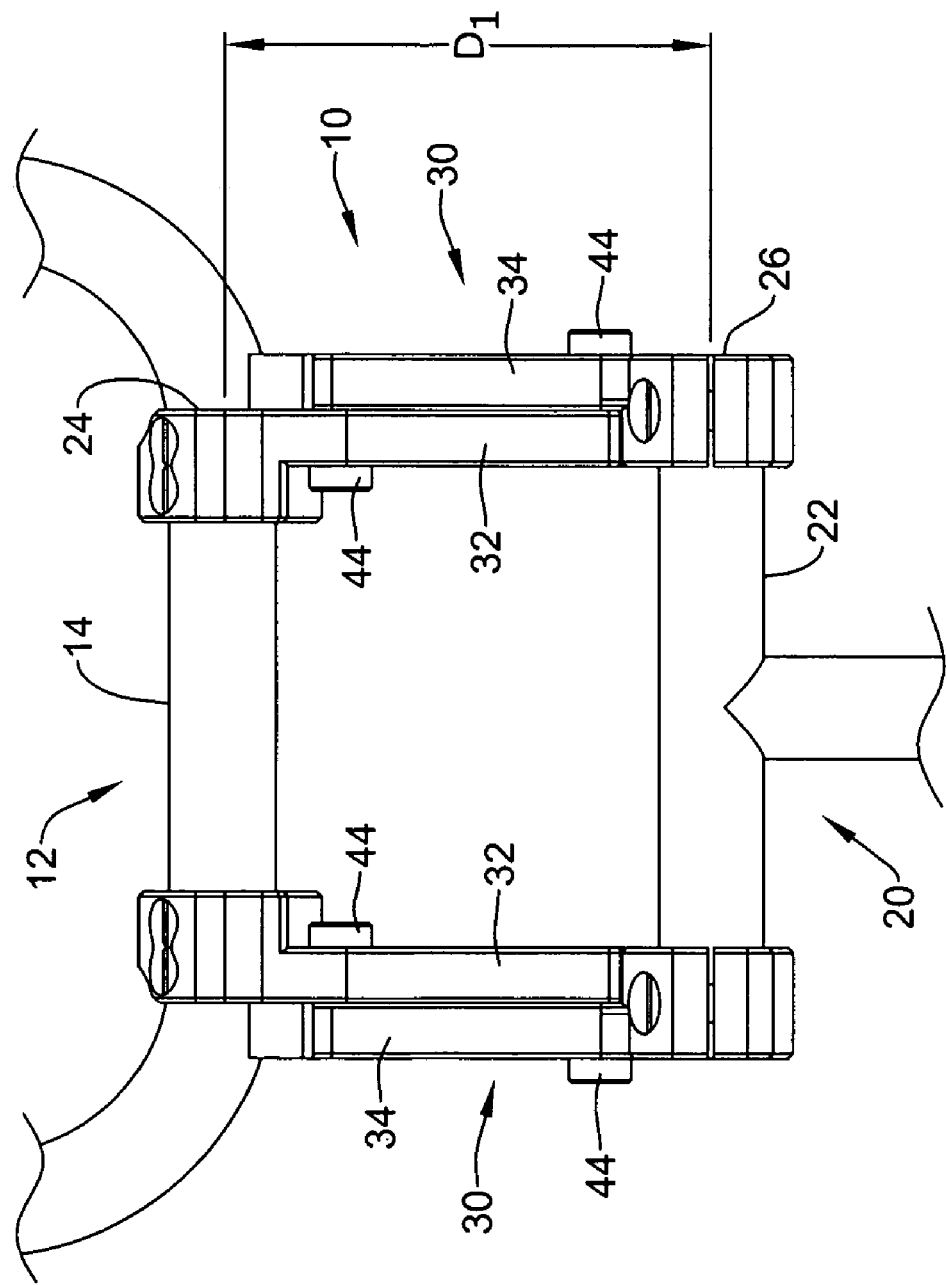
FIGS. 13A-13C show an illustrative riser assembly at select positions, including a fully contracted position, a fully extended position, and an intermediate position.
Figure 13B:
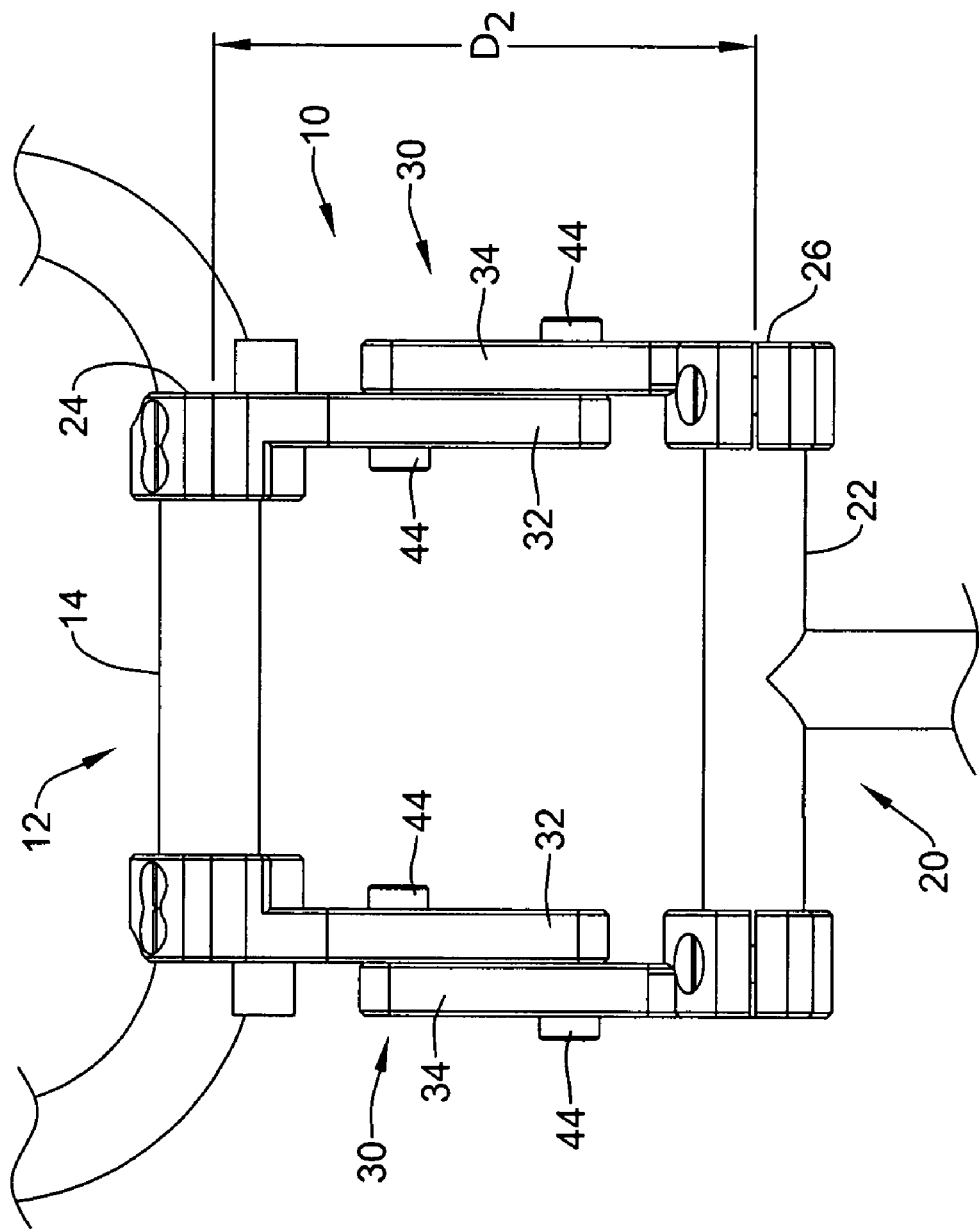
Figure 13C:
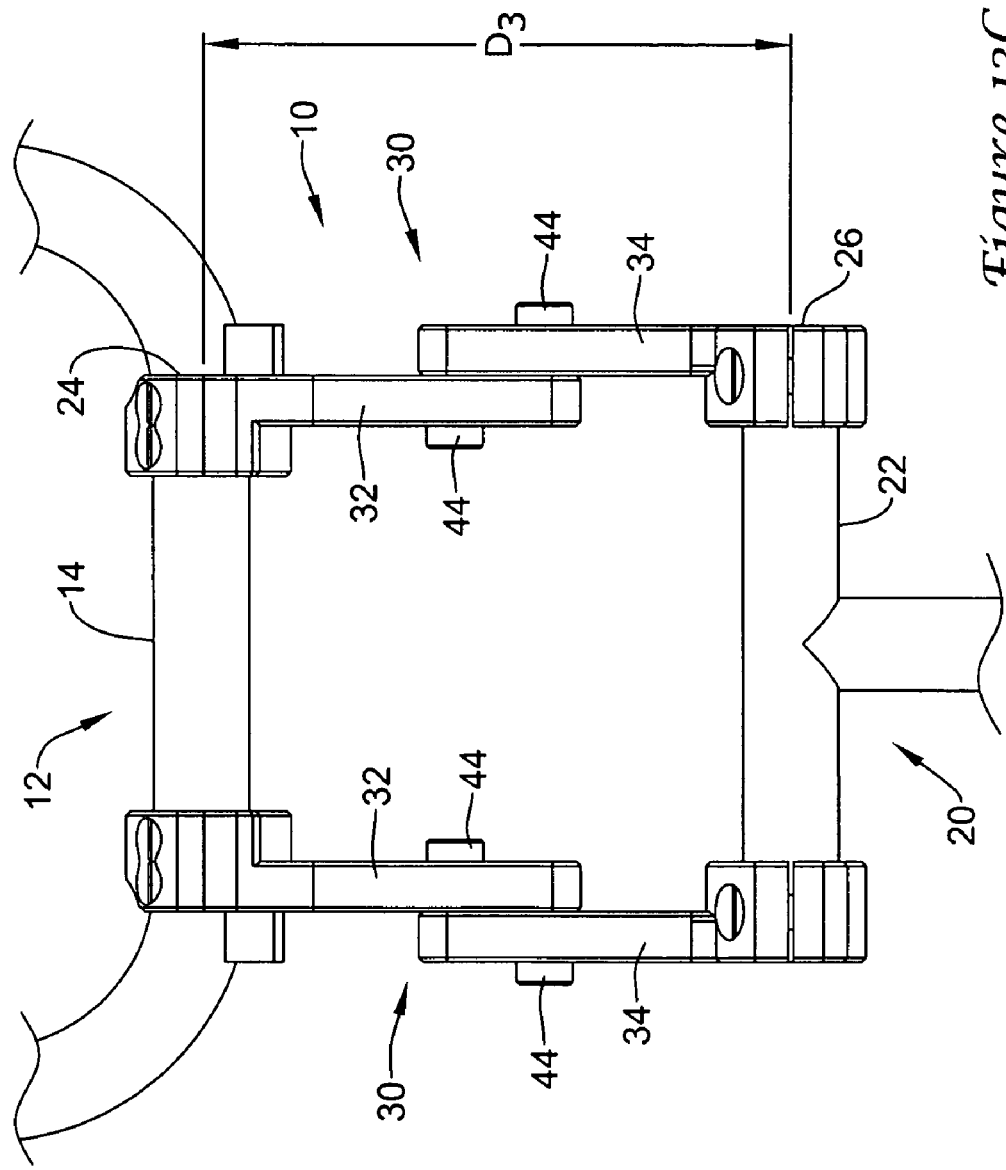

FIGS. 13A-13C illustrate a pair of mounts 30 in various positions in an assembled configuration. FIG. 13A shows the pair of mounts 30 in the contracted or least extended position, FIG. 13B shows the pair of mounts 30 partially extended in an intermediate position, and FIG. 13C shows the pair of mounts in the greatest extended position. In the fully contracted position as shown in FIG. 13A, the mounts 30 may have any desired overall contracted length $D_1$ measured between the coupling location 24 of the handlebar 14 and the coupling location 26 of the steering stem 22, typically about 1 to about 6 inches. For example, in some embodiments, the fully contracted overall length $D_1$ of the mounts 30 may be about 1, 1.5, 2, 2.5, 3, 3.5, 4, 4.5, 5, 5.5 or 6 inches. It should be understood, however, that the above lengths are given by way of example only, and that longer or shorter lengths may be achieved in other embodiments, as desired. In the fully extended position as shown in FIG. 13C, the mounts 30 may have any desired overall extended length $D_3$ measured between the coupling location 24 of the handlebar 14 and the coupling location 26 of the steering stem 22, greater than the fully contracted length $D_1$, typically about 1.5 to about 7 inches. For example, in some embodiments, the fully extended overall length $D_3$ of the mounts 30 may be about 1.5, 2, 2.5, 3, 3.5, 4, 4.5, 5, 5.5, 6, 6.5 or 7 inches. It should be understood, however, that the above lengths are given by way of example only, and that longer or shorter lengths may be achieved in other embodiments, as desired. Thus, in some embodiments, the extendable length (e.g., the amount of variation in length) of the mounts 30 may be about 0.5 inches to about 6 inches, typically about 1 to about 2 inches. In other words, in some embodiments, the upper member 32 and the lower member 34 of the mounts 30 may be able to selectively slidably extend relative to one another a length of about 0.5 inches to about 6 inches. It should be understood, however, that the above lengths are given by way of example only, and that longer or shorter lengths may be achieved in other embodiments, as desired. As shown in FIG. 13B, the upper member 32 and the lower member 34 may be slidably positioned and secured at any position intermediate the fully contracted length and the fully extended length of the mounts 30. Thus, the mounts may be positioned at any intermediate length $D_2$ greater than the fully contracted length $D_1$, but less than the fully extended length $D_3$.

The handlebar 14 may be adjusted to a desired height relative to the steering stem 22 by extending or contracting the first member 32 relative to the second member 34. Sufficient torque may be applied to the fasteners 44 to securely compress the upper member 32 against the lower member 34 in order to prevent the upper member 32 from sliding relative to the lower member 34. Subsequently, the fasteners 44 may be loosened and the height of the handlebar 14 relative to the steering stem 22 may be adjusted to a different height. The fasteners 44 may then be tightened to secure the first member 32 to the second member 34 at a second desired height.

Figure 14:
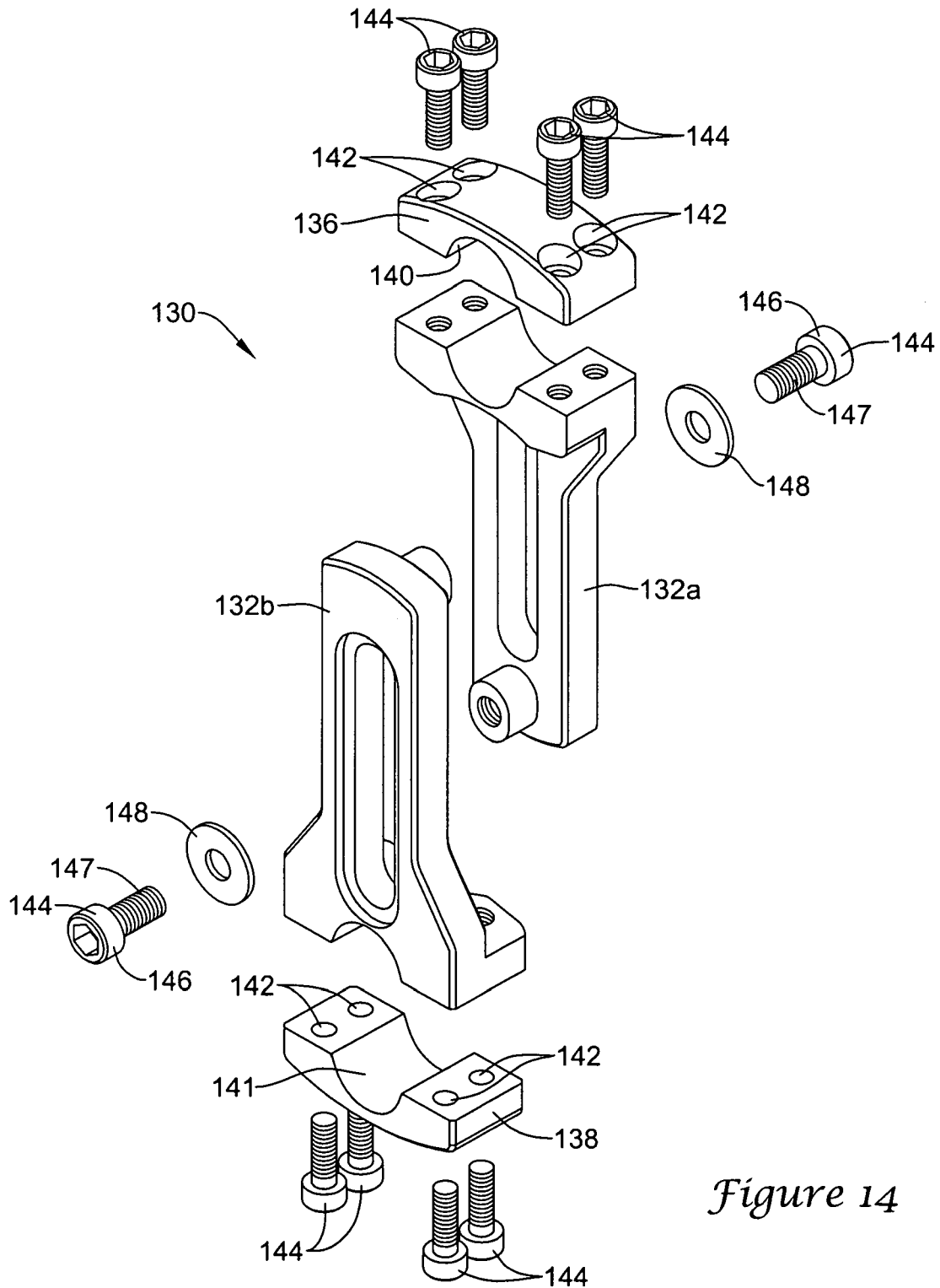
FIG. 14 is an exploded view of a mount of an alternate riser assembly.

FIG. 14 is an exploded view of an alternative embodiment of a support or mount 130 for use as a riser assembly within the scope of the invention. As in the first embodiment, a riser assembly utilizing the mount 130 may include a pair of mounts 130. However, a riser assembly utilizing a single mount 130 or more than two mounts 130 is possible. Each mount 30 may be coupled between a handlebar assembly 12 including a handlebar 14 and a steering structure 20 of a vehicle, such as a steering stem 22.

The mount 130 includes a pair of members 132, a first member 132a and a second member 132b. In this embodiment the first member 132a is substantially identical to the second member 132b, therefore discussion of only one member 132 will follow. As assembled, the second member 132b may be reversed and inverted relative to the first member 132a.

Additionally, the mount 130 may include a first cap 136 and a second cap 138 to facilitate clamping or coupling the mount 130 to another component of a steering mechanism, such as a handlebar 14 or a steering stem 22. The first cap 136 may include a surface preferably adapted and configured to mate with a portion of a handlebar 14. For example, the concave surface 140 of the first cap 136, which may be a semi-circular surface, may be configured to mate with a tubular portion of a handlebar 14. The first cap 136 may include one or a plurality of bores 142 for receiving fasteners 144 which may be used to secure the first cap 136 to the first member 132a. For example, the first cap 136 may include 1, 2, 3, 4, or more bores 142 for receiving fasteners 144. In some embodiments, at least a portion of the bores 142 may be countersunk in order to accommodate the head 146 of a fastener 144. Thus, a tubular portion of a steering mechanism may be coupled between the first member 132a and the first cap 136, such that the tubular portion of the steering mechanism is in contact with the concave surface 140 of the first cap 136. Therefore, the tubular portion of the steering mechanism may be coupled or clamped between the first member 132a and the first cap 136.

The second cap 138 may be substantially identical to the first cap 136 and may include a surface preferably adapted and configured to mate with a portion of a steering mechanism. For example, the second cap 138 may include a concave surface 141, which may be a semi-circular surface, configured to mate with a tubular portion of a steering structure 20, such as a steering stem 22. The second cap 128 may likewise include one or a plurality of bores 142 for receiving fasteners 144 which may be used to secure the second cap 138 to the second member 132b. In some embodiments, at least a portion of the bores 142 may be countersunk in order to accommodate the head 146 of a fastener 144. Thus, a tubular portion of a steering mechanism may be coupled between the second member 132b and the second cap 138, such that the tubular portion of the steering mechanism is in contact with the concave surface 141 of the second cap 138. Therefore, the tubular portion of the steering mechanism may be coupled or clamped between the second member 132b and the second cap 138.

Figure 15:
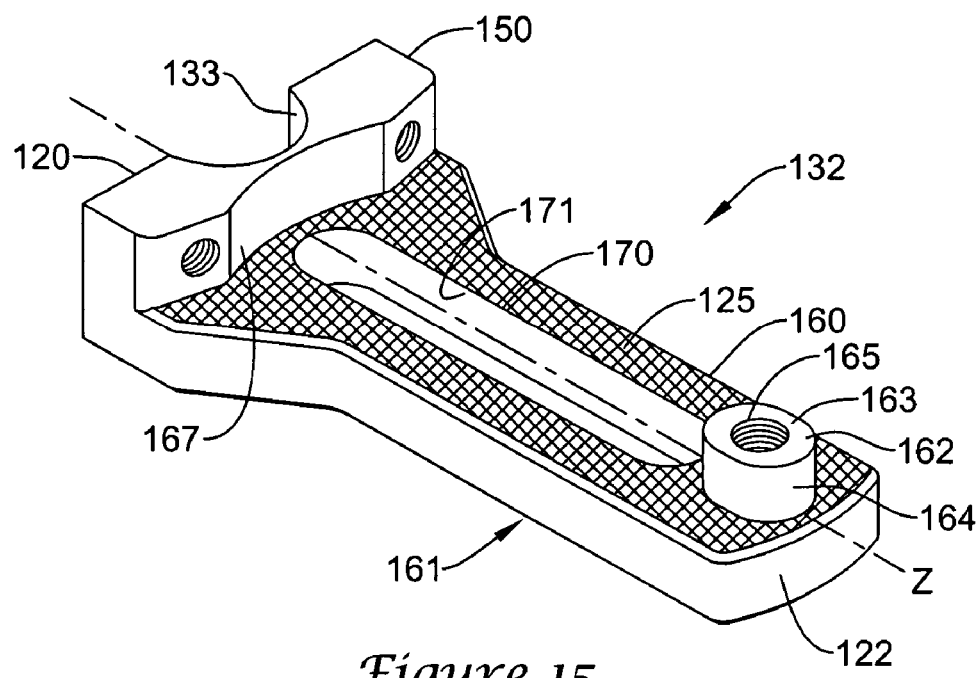
FIG. 15 is a perspective view of a member of a mount as shown in FIG. 14 showing the first side of the member.

FIG. 15 is a perspective view of a member 132 taken from a viewpoint looking towards the first side 160 of the member 132. As mentioned previously, features and elements of the member 132 are equally applicable to both the first member 132a and the second member 132b, as the second member 132b may be substantially identical to the first member 132a.

The member 132 may include a first side 160, an opposing second side 161, a first end 120, and an opposing second end 122. The first side 160 may be a planar surface and the second side 161 may be a planar surface parallel to the first side 160. The first side 160 may have a smooth surface, or the first side 160 may have an irregular surface 125, such as a textured surface, a knurled surface, or a jagged surface, for example. The knurled surface 125 may provide the first side 160 with a higher coefficient of friction, or otherwise impede the ability of the first side 160 to slide relative to an abutting surface.

The member 132 may include a coupling portion 150 at the first end 120 of the member 132. The coupling portion 150 may include a first concave surface 133 adapted and configured for coupling the member 132 to a steering mechanism, such as a tubular member of a steering mechanism. Thus, a tubular member may be in contact with the first concave surface 133 when the member 132 is coupled to a steering mechanism. The coupling portion 150 may also include a second surface, which may be a second concave surface 167. The second concave surface 167 may abut the second end 122 of an opposing member 132 when two members 132 are in a fully contracted position in an assembled orientation.

The member 132 may include a protrusion 162 extending from the first side 160 of the member 132. The protrusion 162 may be located proximate the second end 122 of the member 132. The protrusion 162 may have a peripheral wall 164 and an end surface 163, which may be any desirable shape. For example, the end surface 163 may be square, rectangular, circular, oval, or the like.

The protrusion 162 may include a bore 165 extending into the protrusion 162 from the end surface 163. The bore 165 may be a through hole extending from the end surface 163 to the second side 161 of the member 132, or the bore 165 may be a blind hole extending into the member 132. The bore 165 may be a threaded bore for receiving and threadably engaging a threaded portion 147 of a fastener 144, or the bore 165 may be unthreaded allowing a fastener 144 to extend therethrough.

The member 132 may include one or more openings, such as an elongate slot 170. The elongate slot 170 may be positioned along a portion of the member 132 between the coupling portion 150 and the protrusion 162. The elongate slot 170 may extend along the first side 160 and may include a peripheral surface 171 extending from the first side 160 to the second side 161. In other embodiments, the elongate slot 170 may only extend into the member 132 from the first side 160, but not through the member 132 to the second side 161.

The protrusion 162, the elongate slot 170, and the center of curvature of the concave surface 133 may be aligned in a single longitudinal orientation along axis Z. In other words, the center point of the protrusion 162 may be aligned with the central longitudinal axis of the elongate slot 170 and the center of curvature of the concave surface 133 along axis Z. Thus, the member 132 may be substantially symmetrical along axis Z.

Figure 16:
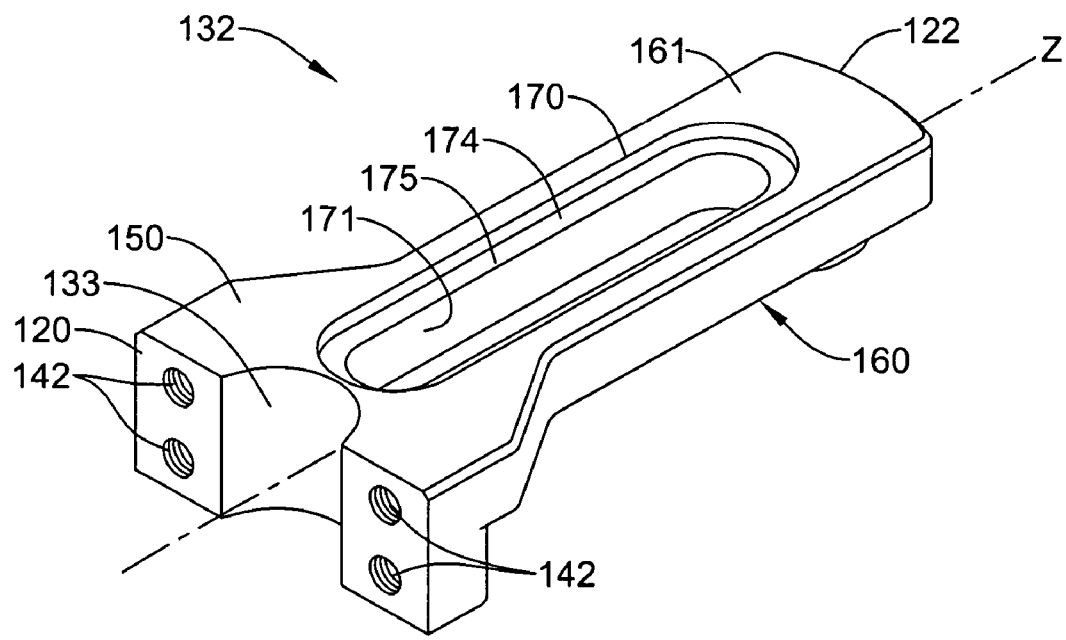
FIG. 16 is a perspective view of a member of a mount as shown in FIG. 14 showing the second side of the member.

FIG. 16 is a perspective view of the member 132 taken from a viewpoint looking towards the second side 161 of the member 132. As shown in FIG. 16, the elongate slot 170 may include a flange 175 providing a stepped edge 174. Thus, the peripheral wall 171 of the elongate slot 170 may include a jog or rim. The flange 175 may extend around the periphery of the elongate slot 170, or the flange 175 may extend along a portion of the periphery of the elongate slot 170. In other embodiments, the elongate slot 170 may not include a flange 175. In some embodiments, the member 132 may include one or a plurality of holes extending into or through the member 132. The one or a plurality of holes may be adapted to receive a fastener 144. The fastener 144 may be selectively disposed in one of the holes to provide finite adjustment for longitudinally adjusting the height of the riser assembly. A different hole may be chosen to receive the fastener 144 in order to alter the height of the riser assembly.

The coupling portion 150 may include one or a plurality of bores 142. The bores 142 may be through holes extending through the member 132 or the bores 142 may be blind holes extending into the member 132. In some embodiments, a portion of the bores 142 may be through holes and the remainder of the bores 142 may be blind holes. The bores 142, or a portion thereof, may be threaded bores for receiving and threadably engaging a threaded portion 147 of a fastener 144, or the bores 142, or a portion thereof may be unthreaded allowing a fastener 144 to extend therethrough.

Figure 17A:
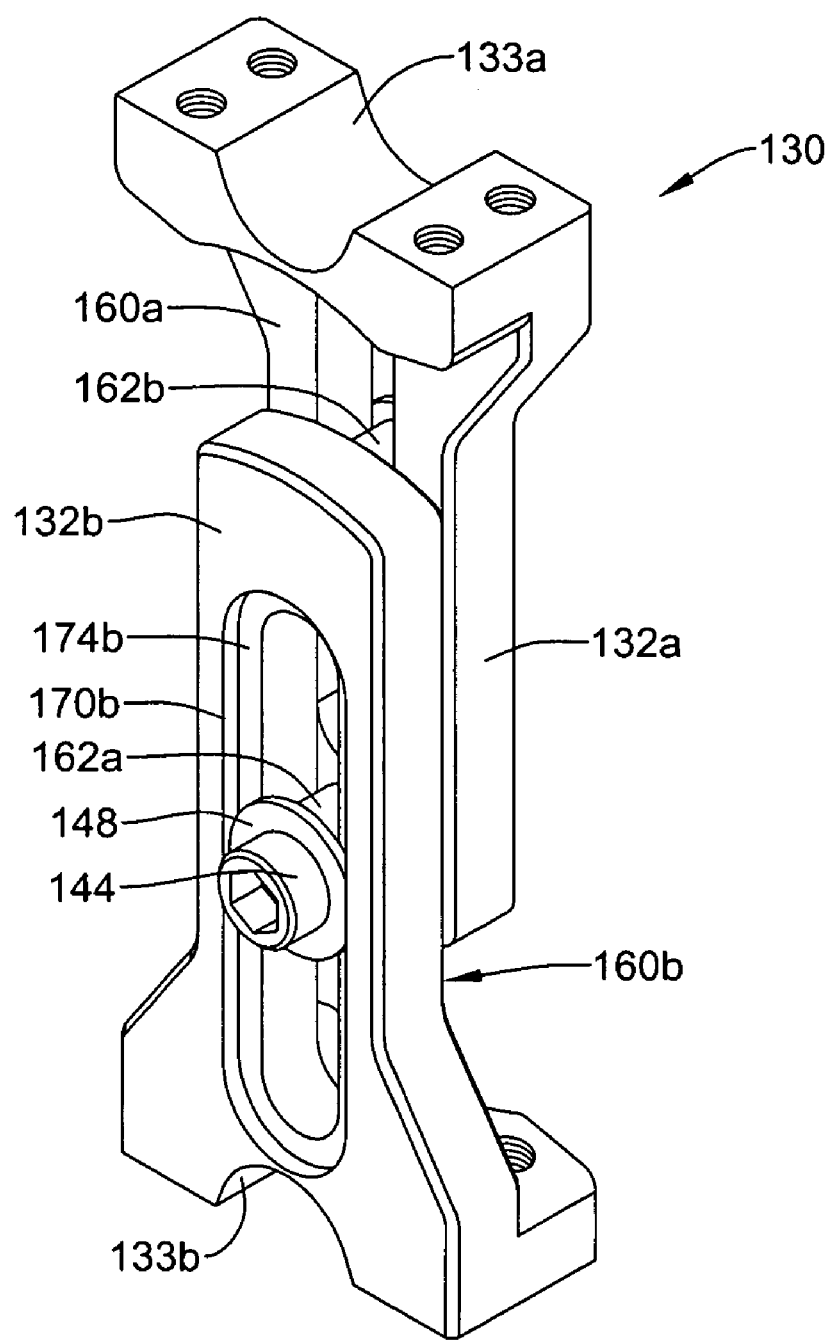
FIGS. 17A and 17B are perspective views of a mount as shown in FIG. 14 in an assembled configuration.
Figure 17B:
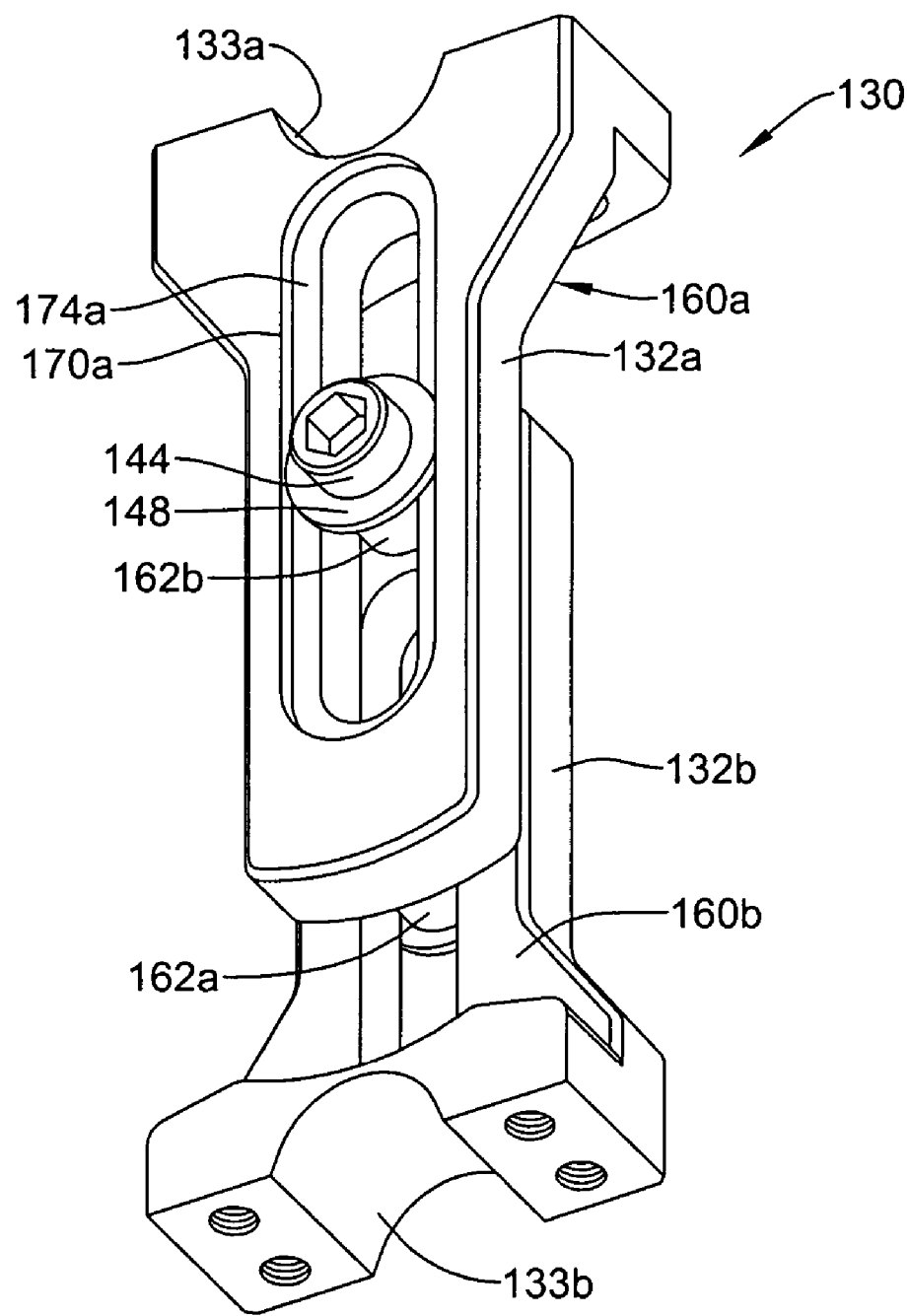

In an assembled orientation, as shown in FIGS. 17A and 17B, the mount 130 includes a first member 132a and a second member 132b in selective sliding engagement with one another. The first side 160a of the first member 132a and the first side 160b of the second member 132b may be in contact with one another. For example, the first side 160a of the first member 132a may abut the first side 160b of the second member 132b. In an abutting orientation, the protrusion 162a of the first member 132a extends into the elongate slot 170b of the second member 132b, and the protrusion 162b of the second member 132b extends into the elongate slot 170a of the first member 132a. A fastener 144, such as a threaded fastener, may extend through the elongate slot 170b of the second member 132b such that a threaded portion 147 of the fastener 144 may be threadedly engaged with the bore 165a of the protrusion 162a of the first member 132a. Likewise, a threaded fastener 144 may extend through the elongate slot 170a of the first member 132a such that a threaded portion 147 of the fastener 144 may be threadedly engaged with the bore 165b of the protrusion 162b of the second member 132b.

The fasteners 144 may be selectively loosened to allow the first member 132a to longitudinally extend and/or contract relative to the second member 132b. When the fasteners 144 are sufficiently loosened (or removed), the first member 132a may be longitudinally extended and/or contracted relative to the second member 132b, to provide the desired height for the mount 130. The fasteners 144 may then be selectively tightened to a desired torque to then prevent the first member 132a from further longitudinally extending and/or contracting relative to the second member 132b, thus securing the two members 132a, 132b together.

It is also contemplated that the first member 132a and/or the second member 132b may include a hole, such as a through hole or a blind hole, in addition to or instead of the protrusion 162a, 162b for receiving a fastener 144. In some embodiments, the fastener 144 may extend through the elongate slot 170a of the first member 132a and into or through a hole of the second member 132b. Thus, a threaded hole in the second member 132b may secure the fastener, or a threaded burr, such as a nut, may be threadedly secured to the fastener 144 on the second side 161b of the second member 132b to couple the first member 132a to the second member 132b. In other embodiments, a fastener 144 may extend through a hole of the first member 132a and into or through a hole of the second member 132b. Thus, a threaded hole in the second member 132b may secure the fastener 144, or a threaded burr, such as a nut, may be threadedly secured to the fastener 144 on the second side 161b of the second member 132b to couple the first member 132a to the second member 132b. In some embodiments, a fastener 144 may be used as a set screw, thus extending through a threaded hole in the first member 132a and abutting the second member 132b.

Additionally, other means of sliding engagement between the first member 132a and the second member 132b are contemplated. For instance, one of the first or second members 132a, 132b may include a groove or channel and the other of the first and second members 132a, 132b may include a protrusion or tab extending into the groove or channel and allowing selective sliding engagement between the members 132a, 132b. In some embodiments, each member 132a, 132b may include a channel and a protrusion mating with a protrusion and a channel, respectively, of the opposing member 132a, 132b.

For example, in other embodiments, the upper and/or lower members (e.g., 32, 34, 132a, 132b) may include or be made of other structures, such as tubes, rods, channels, bars, or the like, that may be in telescoping, sliding engagement with one another. Additionally, in some other embodiments, the sides of the upper and lower members in sliding, selectively extendable engagement may be planar, concave curved, convex curved, or otherwise be in mating relationship with one another.

Additionally, or alternatively, one or more of the first and second members 132a, 132b may include a plurality of holes, such as through holes or blind holes, disposed along a common axis of the member 132. Each hole may extend through the member 132 from the first side 160 to the second side 161, or the holes may extend in the member 132 from the first side 160, but not extend through the member to the second side 161. The plurality of through holes may provide finite adjustment positions for extending and/or contracting the mount 130. A fastener may selectively be disposed in one of the holes to secure the mount 130 at a desired height. The height of the mount 130 may be adjusted by disposing the fastener into a different chosen hole.

In should also be understood that any of a broad variety of fastener mechanisms, assemblies, or structures may be used to selectively secure or lock the upper and lower members into a non-slidable position. For example, while a threaded fastener was discussed in some embodiments above, other fasteners, such as pins, keys, rods, posts, spring loaded devices, detent mechanisms, ties, latches, etc. may be used.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A handlebar riser assembly for use with a steering mechanism of a vehicle, the handlebar riser assembly comprising:
   a pair of mounts for coupling a handlebar to a vehicle, wherein each mount includes:
      a first member having a first side, a second side, and an elongated slot along the first side and extending through the first member from the first side to the second side, and a protrusion extending from the first side;
      a second member having a first side, a second side, an elongated slot along the first side and extending through the second member from the first side to the second side, and a protrusion extending from the first side;
      wherein the first side of the first member is facing the first side of the second member, such that the protrusion of the first member is slidably disposed in the elongated slot of the second member and the protrusion of the second member is slidably disposed in the elongated slot of the first member.

2. The handlebar riser assembly of claim 1, wherein each of the protrusions includes a threaded bore.

3. The handlebar riser assembly of claim 2, wherein the handlebar riser assembly further comprises a plurality of threaded fasteners, wherein one of the plurality of threaded fasteners is disposed in the threaded bore of each of the protrusions of each of the first and second members.

4. The handlebar riser assembly of claim 1, wherein the first member and the second member are equivalent.

5. The handlebar riser assembly of claim 1, wherein the first member includes a clamping portion having a concave surface for coupling the first member to a handlebar.

6. The handlebar riser assembly of claim 5, wherein the second member includes a clamping portion having a concave surface for coupling the second member to a steering stem of a vehicle.

7. The handlebar riser assembly of claim 1, wherein the elongated slot of the first member includes a flange.

8. The handlebar riser assembly of claim 7, wherein the elongated slot of the second member includes a flange.

9. The handlebar riser assembly of claim 8, wherein each of the protrusions further includes a threaded bore and a threaded fastener disposed in the bore of each of the protrusions, wherein each threaded fastener has a head and a threaded portion, and wherein a planar surface of the head contacts a planar surface of the flange.

10. The handlebar assembly of claim 8, wherein each of the protrusions further includes a threaded bore and a threaded fastener disposed in the bore of each of the protrusions, wherein each threaded fastener includes a washer, and wherein a planar surface of the washer contacts a planar surface of the flange.

11. A steering assembly for a vehicle, the steering assembly comprising:
 a handlebar assembly;
 a steering stem; and
 a pair of risers, each riser coupled between the handlebar assembly and the steering stem, defining a distance between the handlebar assembly and the steering stem;
 wherein each riser includes a first member and a second member selectively slidably engaged with the first member such that the handlebar assembly may be longitudinally extended or contracted relative to the steering stem; and
 fastening structure for selectively securing the first member to the second member while providing infinite variability of the distance between the handlebar assembly and the steering stem within the slidable engagement of the first and second members.

12. The steering assembly of claim 11, wherein the first member has a first planar side and a second side, and the second member has a first planar side and a second side, wherein the first planar side of the second member is in contact with the first planar side of the first member.

13. The steering assembly of claim 12, wherein the first member includes an elongated slot along the first planar side and extending through the first member from the first planar side to the second side of the first member.

14. The steering assembly of claim 13, wherein the elongated slot of the first member has a flange.

15. The steering assembly of claim 14, wherein the second member includes a protrusion extending into the elongated slot of the first member.

16. The steering assembly of claim 15, wherein the protrusion of the second member includes a threaded bore, wherein the fastening structure includes a threaded fastener in threaded engagement with the threaded bore of the protrusion of the second member.

17. The steering assembly of claim 16, wherein the second member includes an elongated slot along the first planar side and extending through the second member from the first side to the second side of the second member.

18. The steering assembly of claim 17, wherein the elongated slot of the second member has a flange.

19. The steering assembly of claim 18, wherein the first member includes a protrusion extending into the elongated slot of the second member.

20. The steering assembly of claim 19, wherein the protrusion of the first member includes a threaded bore.

21. The steering assembly of claim 20, wherein fastening structure includes a second threaded fastener in threaded engagement with the threaded bore of the protrusion of the first member.

22. The steering assembly of claim 21, wherein the first member includes a coupling portion having a concave surface for coupling to the handlebar assembly.

23. The steering assembly of claim 22, wherein the second member includes a coupling portion having a concave surface for coupling to the steering stem.

24. A handlebar adjustment mechanism for use with a steering mechanism of a vehicle, the handlebar adjustment mechanism comprising:
 a first member having a first end, a second end, a first planar side, a second side opposite the first planar side, a through opening extending from the first planar side to the second side, and a coupling portion having a concave surface near the first end for coupling the first member to a tubular member;
 a second member having a first end, a second end, a first planar side, a second side opposite the first planar side, and a coupling portion having a concave surface near the first end for coupling the second member to a tubular member;
 wherein the first member is in sliding engagement with the second member, such that the first member may slidably extend and/or contract within the opening from a first position to a second position relative to the second member; and
 a fastener extending through the opening of the first member for selectively securing the first member to the second member.

25. The handlebar adjustment mechanism of claim 24, wherein the first planar side of the first member is in abutting contact with the first planar side of the second member.

26. The handlebar adjustment mechanism of claim 24, wherein the through opening in the first member is an elongated slot.

27. The handlebar adjustment mechanism of claim 26, wherein the elongated slot includes a flange.

28. The handlebar adjustment mechanism of claim 24, wherein the second member includes a through opening extending from the first planar side to the second side.

29. The handlebar adjustment mechanism of claim 24, wherein the second member includes a protrusion extending into the through opening of the first member.

30. The handlebar adjustment mechanism of claim 24, wherein the first planar side of the first member includes a knurled surface.

31. The handlebar adjustment mechanism of claim 30, wherein the first planar side of the second member includes a knurled surface.

32. A handlebar riser assembly for use with a steering mechanism of a vehicle, the handlebar riser assembly comprising:
 a pair of mounts for coupling a handlebar to a vehicle, each mount including:
  a first member having a first side, a second side, and an elongated slot having a peripheral surface extending from the first side to the second side; and a second member including a first side, a second side, and a protrusion extending from the first side;

wherein the first side of the first member is facing the first side of the second member, such that the protrusion of the second member is slidably disposed within the elongated slot of the first member for selective length adjustment from a first length to a second length; and a threaded fastener extending through the elongated slot of the first member for selectively securing the first member to the second member.

33. The handlebar riser assembly of claim 32, wherein the elongated slot has a stepped peripheral surface.

34. The handlebar riser assembly of claim 32, wherein the protrusion includes a bore, and wherein the threaded fastener extends into the bore.

35. The handlebar riser assembly of claim 34, wherein the bore is a threaded bore, and wherein the threaded fastener is in threaded engagement with the threaded bore.

36. A handlebar riser assembly for use in coupling a handlebar with a steering mechanism of a vehicle, the handlebar riser assembly comprising:

a pair of mounts for coupling the handlebar to the steering mechanism of the vehicle each of the mounts having a length that is selectively adjustable, wherein each mount includes:

a first member having a handlebar coupling portion for coupling to the handlebar, and an elongate body portion extending from the handlebar coupling portion;

a second member having a steering mechanism coupling portion for coupling to the steering mechanism of the vehicle, and an elongate body portion extending from the steering mechanism coupling portion;

wherein the elongate body portion of the second member is in selective sliding engagement with the elongate body portion of the first member along an axis for infinitely selective length adjustment of the mount along the axis within the sliding engagement of the elongate body portions; and coupling structure for selectively securing the first elongated member to the second elongated member to selectively prevent sliding of the elongate body portions relative to one another.

\* \* \* \* \*